United States Patent
Balakrishna

(10) Patent No.: US 10,907,986 B2
(45) Date of Patent: Feb. 2, 2021

(54) USER FAMILIARIZATION WITH A NOVEL ROUTE FOR REDUCING COGNITIVE LOAD ASSOCIATED WITH NAVIGATION

(71) Applicant: HERE Global B.V., Eindhoven (NL)

(72) Inventor: Arun Balakrishna, Frankfurt (DE)

(73) Assignee: HERE Global B.V., Eindhoven (NL)

( * ) Notice: Subject to any disclaimer, the term of this patent is extended or adjusted under 35 U.S.C. 154(b) by 94 days.

(21) Appl. No.: 16/114,822

(22) Filed: Aug. 28, 2018

(65) Prior Publication Data
US 2020/0072636 A1 Mar. 5, 2020

(51) Int. Cl.
*G01C 21/36* (2006.01)

(52) U.S. Cl.
CPC ..... *G01C 21/3697* (2013.01); *G01C 21/3641* (2013.01); *G01C 21/3644* (2013.01); *G01C 21/3655* (2013.01)

(58) Field of Classification Search
CPC .......... G01C 21/3453; G01C 21/3484; G01C 21/3492; G01C 21/3641; G01C 21/3644; G01C 21/3655; G01C 21/3697
See application file for complete search history.

(56) References Cited

U.S. PATENT DOCUMENTS

| | | | | |
|---|---|---|---|---|
| 7,424,363 B2 * | 9/2008 | Cheng | ................ | G01C 21/3641 340/995.23 |
| 9,464,909 B2 * | 10/2016 | Chen | ................. | G01C 21/3605 |
| 9,851,215 B2 * | 12/2017 | So | ................... | G01C 21/3484 |
| 2004/0260465 A1 * | 12/2004 | Tu | ..................... | G01C 21/3679 701/426 |
| 2009/0276153 A1 * | 11/2009 | Lee | .................... | G01C 21/3602 701/414 |

(Continued)

FOREIGN PATENT DOCUMENTS

| | | |
|---|---|---|
| EP | 1233389 A2 | 8/2002 |
| EP | 2995909 A1 | 3/2016 |

(Continued)

OTHER PUBLICATIONS

Extended European Search Report for European Patent Application No. 19194018.8, dated Jan. 28, 2020, (9 pages), Munich, Germany.

(Continued)

*Primary Examiner* — Barbar Sarwar
(74) *Attorney, Agent, or Firm* — Alston & Bird LLP

(57) ABSTRACT

New route information is received. The new route information comprises an origin location, a destination location, and a time. A route is determined based on the new route information. Route data corresponding to the route is analyzed based on a high cognitive load model to identify one or more high cognitive load portions of the route. The route data comprises at least one of (a) point of interest data, (b) entity of interest data, or (c) roadway data. Familiarization information is generated for the high cognitive load portions. The familiarization information comprises (a) familiarization content and (b) a trigger point. The familiarization content is configured to be provided to a user via a user interface of a vehicle apparatus when, based on a location sensor of the vehicle apparatus, it is determined that the vehicle apparatus has reached the trigger point. The familiarization information is provided to the vehicle apparatus.

20 Claims, 10 Drawing Sheets

(56) References Cited

U.S. PATENT DOCUMENTS

| | | |
|---|---|---|
| 2011/0238690 A1 | 9/2011 | Arrasvuori et al. |
| 2012/0022782 A1* | 1/2012 | Laube ................ G01C 21/3679 701/410 |
| 2012/0280835 A1* | 11/2012 | Raz .................. G08G 1/096775 340/905 |
| 2015/0160020 A1* | 6/2015 | van Hemert ............. A61B 5/18 701/532 |
| 2016/0069699 A1* | 3/2016 | Chen .................. G01C 21/3682 701/426 |
| 2016/0183068 A1* | 6/2016 | Shen ..................... G06Q 10/109 455/466 |
| 2016/0258769 A1 | 9/2016 | Caine et al. |
| 2016/0341564 A1 | 11/2016 | Cheng |
| 2017/0115124 A1 | 4/2017 | Mullen |
| 2017/0284822 A1 | 10/2017 | Foster et al. |
| 2017/0343363 A1* | 11/2017 | Goldberg ........... G01C 21/3697 |
| 2018/0009442 A1* | 1/2018 | Spasojevic ............. A61B 3/112 |
| 2019/0346276 A1 | 11/2019 | Jackson et al. |

FOREIGN PATENT DOCUMENTS

| | | | | |
|---|---|---|---|---|
| WO | WO 2009/143903 A1 | 12/2009 | | |
| WO | WO-2009143903 A1 * | 12/2009 | ......... | G01C 21/3641 |
| WO | WO 2010/040385 A1 | 4/2010 | | |
| WO | WO-2010040385 A1 * | 4/2010 | ......... | G01C 21/3415 |

OTHER PUBLICATIONS

Cheng, Hua et al. *Generating Navigation Information Based On The Driver's Route Knowledge*, In Proceedings of the Coling 2004 Workshop On Robust and Adaptive Information Processing For Mobile Speech Interfaces, Aug. 28, 2004, pp. 31-38, Geneva, Switzerland.

Stenger, Mike, "Google Patent Reveals Augmented Reality GPS Navigation", Andriod Authority, Apr. 23, 2013, 4 pages, retrieved from <https://www.androidauthority.com/google-files-new-patent-195908/> on Jan. 19, 2019, 4 pages.

Geldof, Sabine, et al., "Improving Route Directions on Mobile Devices", In proceedings of ITRW on Multi-Modal Dialogue in Mobile Environments, Kloster Irsee, Germany, Jun. 17-19, 2002, ISCA Archive, retrieved from <https://pdfs.semanticscholar.org/ec3f/1836bb5992f3cea6c8bbda5d56c265bc8751.pdf> on Jan. 19, 2019, 15 pages.

* cited by examiner

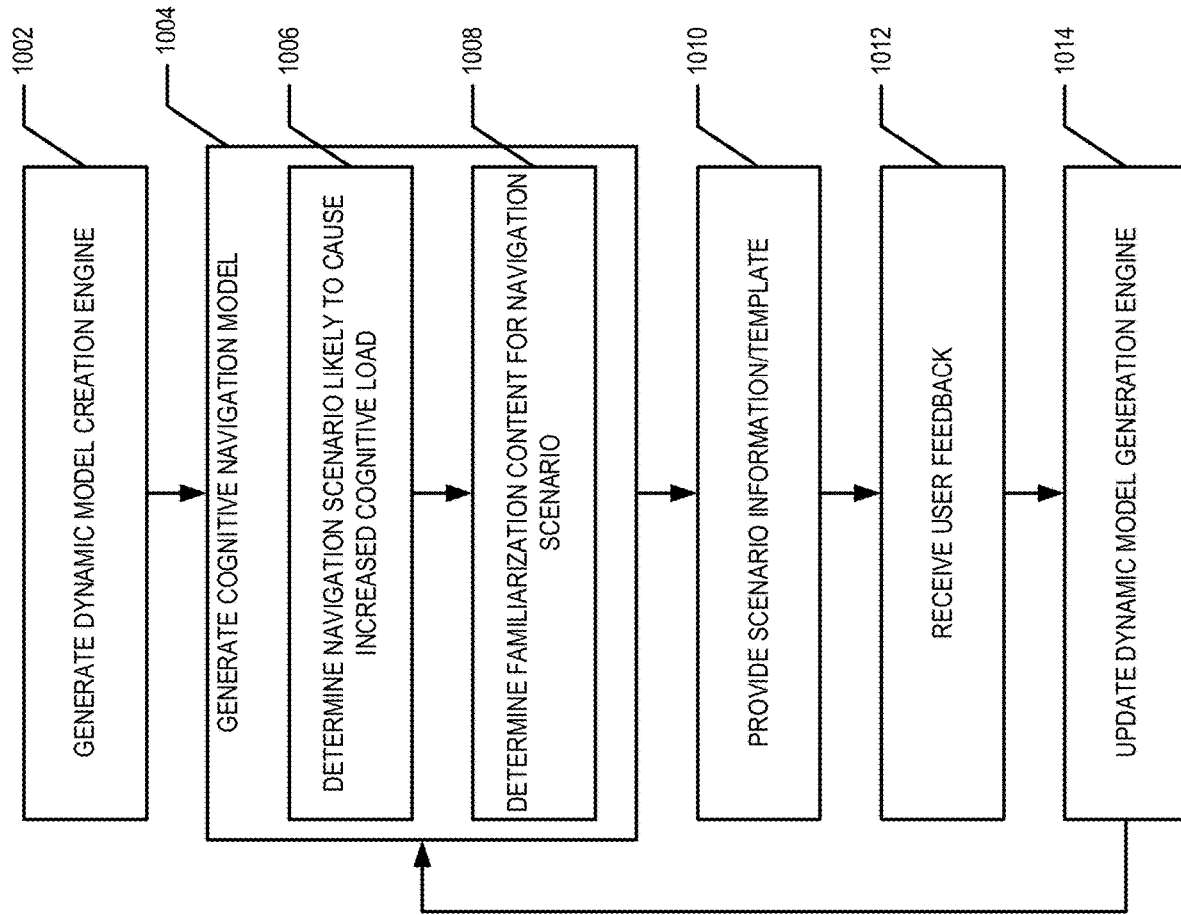

USER FAMILIARIZATION WITH A NOVEL ROUTE FOR REDUCING COGNITIVE LOAD ASSOCIATED WITH NAVIGATION

TECHNOLOGICAL FIELD

An example embodiment relates generally to reducing the cognitive load of a user navigating a route. An example embodiment relates generally to generating and providing optimum familiarization content to a user.

BACKGROUND

Navigating an unfamiliar route is often stressful. For example, if an intersection is an all-way stop intersection, but is not clearly marked as such, a user that is unfamiliar with the intersection may find navigating through the intersection to be stressful. For example, the cognitive load on an individual (e.g., a human operator/driver of an automobile or other vehicle) when navigating an unfamiliar route may be quite high compared to when navigating a familiar route. The demand of cognitive resources for the primary task (e.g., operating/driving an automobile or other vehicle) may be compromised by the allocation of more cognitive resources for navigating the unfamiliar route. Therefore, a user's unfamiliarity with a route may cause the user stress when navigating the unfamiliar route and may negatively affect the user's ability to efficiently navigate the unfamiliar route.

BRIEF SUMMARY OF SOME EXAMPLE EMBODIMENTS

Various embodiments provide methods, systems, apparatuses, and computer program products for generating and providing familiarization content to a user navigating a route. For example, familiarization content may be provided to a user navigating an unfamiliar and/or novel route. Various embodiments provide methods, systems, apparatuses, and computer program products that generate and/or make use of entities of interest (EOIs) based on static and/or dynamic (e.g., time dependent) information/data regarding a related and/or linked set of two or more points of interest (POIs). Various embodiments provide a human cognitive navigation model that may be used to identify portions of a navigation route that may correspond to an increased cognitive load for a human operator/driver navigating the navigation route. For example, in an example embodiment, if a navigation system determines that a user has requested route information/data for navigating an unfamiliar and/or novel route, a navigation engine may provide route information/data to an extraction engine that identifies high cognitive load portions of the route (e.g., portions of the route that are expected to cause a user to have an increased cognitive load while the user navigates the portion of the route) based on a cognitive navigation model configured to model human cognitive processing of navigation processes. The cognitive navigation model may also receive configuration information/data such as information/data regarding the user (e.g., operating/driving experience level, number of years operating/driving, user preferences, and/or the like) and POI and/or EOI information/data for one or more POIs and/or EOIs located along the route. In an example embodiment, the cognitive navigation model provides scenario information/data and/or scenario templates for use in identifying and/or determining portions of the route that are likely to cause the user stress and/or are likely to increase the user's cognitive load while navigating those portions of the route. The extraction engine may then generates and/or extracts familiarization information/data comprising familiarization content regarding the identified and/or determined portions of the route. In an example embodiment, the familiarization information/data corresponding to a high cognitive load portion is generated and/or extracted from the route information/data based at least in part on the scenario information/data and/or scenario template used to identify the high cognitive load portion. A vehicle apparatus onboard the vehicle being operated and/or driven by the user may then provide the familiarization content to the user at appropriate points and/or times as the user navigates the route in an efficient way.

In various embodiments, an EOI is an entity generated by linking two or more POIs. In various embodiments, the linking between the two or more POIs may be dynamic and/or time dependent. For example, an EOI may be generated by linking a school, an ice cream shop near the school, and a cross walk between the school and the ice cream shop. The POI information/data corresponding to the school may indicate the time the school day begins and/or ends (e.g., 8 am to 3 pm) and may also indicate days on which the school is open or is not open (weekends, holidays, breaks, and/or the like). The POI information/data corresponding to the ice cream shop may indicate the hours that the ice cream shop is open (e.g., that the ice cream shop is open from 2 pm to 8 pm). In an example embodiment, the EOI information/data may indicate that the EOI is only relevant between 3 pm and 8 pm on days that the school is open. In an example embodiment, the EOI information/data may further indicate the current status of a walk signal located at the cross walk. For example, the EOI information/data may comprise (near) real-time information/data corresponding to the status of a walk signal at the cross walk shortly before the user arrives at the cross walk. In various embodiments, EOIs may be generated using an EOI model and/or other data extraction model that takes into account POI information/data (static and/or dynamic), map information/data (e.g., via a geographic database, one more map layers, and/or the like), operating/driving effort information/data, weather information/data, current and/or historical traffic information/data, (near) real-time traffic system information/data, and/or the like. In various embodiments, two or more POIs may be linked through a logical relationship and may be grouped together to form an EOI based on logical rules.

In various embodiments, a high cognitive load model is configured to determine and/or identify navigation scenarios that are likely and/or expected to cause an increased cognitive load for a individual user, class of users, and/or users in general. In an example embodiment, the high cognitive load model is a human cognitive navigation model configured for modeling human cognitive processing in various navigation scenarios. In an example embodiment, the cognitive navigation model is trained using navigation information/data, user behavior information/data, and/or feedback directly from one or more users (e.g., a user questionnaire). In an example embodiment, the cognitive navigation model is trained using machine learning with support from a machine learning engine. In an example embodiment, the high cognitive load model is configured to provide scenarios information/data and/or scenario templates configured for use in identifying high cognitive load portions of a route based on the route information/data for the route. In an example embodiment, the cognitive navigation model is configured to provide scenarios information/data and/or scenario templates that provide an indication of the familiarization information/data to be generated, determined, and/or extracted for a high cognitive load portion. For example, an instance of scenario information/data and/or a scenario template may indicate the content (e.g., text, graphics, and/or the like), form, and/or the like of familiarization content to be generated, determined, and/or extracted for a high cognitive load portion.

As should be understood, various embodiments of the present invention provide improvements to navigation and/or routing technologies and corresponding interactive user interfaces (IUIs). For example, in various embodiments, an improved IUI is provided wherein a user may provide input regarding a particular trip (e.g., provide input indicating a destination location) and be provided with not only an overview and/or turn-by-turn instructions for a route to the destination location, but appropriately timed familiarization content to decrease the user's stress level and/or cognitive load as the user navigates the route. For example, various embodiments are configured to provide a user with improved, (near) real-time accurate route information/data and/or familiarization content. In various embodiments, the dynamic and/or static elements of an EOI may be used to identify high cognitive load portions and/or to generate the corresponding familiarization content. For example, various embodiments provide a cognitive navigation model that enables the provision of appropriate and effective familiarization content for portions of the route where providing familiarization content is most helpful for a user.

In an example embodiment, new route information is received via a network apparatus comprising at least one processor, at least one memory, and at least one communications interface configured to communicate via at least one network. The new route information comprises an origin location, a destination location, and a time. A route is determined based on the new route information via the network apparatus. Route data corresponding to the route is analyzed via the network apparatus based on a high cognitive load model to identify one or more high cognitive load portions of the route, the route data comprising at least one of (a) point of interest (POI) data, (b) entity of interest (EOI) data, or (c) roadway data. Familiarization information is generated via the network apparatus for at least one of the one or more high cognitive load portions. The familiarization information comprises (a) familiarization content and (b) a trigger point. The familiarization content is configured to be provided to a user via a user interface of a vehicle apparatus when, based at least in part on a location sensor of the vehicle apparatus, it is determined that the vehicle apparatus has reached the trigger point. The familiarization information is provided via the network apparatus to the vehicle apparatus.

In accordance with an aspect of the present invention, a method for providing a familiarization information/data is provided. In an example embodiment, the method comprises receiving, via a network apparatus comprising at least one processor, at least one memory, and at least one communications interface configured to communicate via at least one network, new route information. The new route information comprising an origin location, a destination location, and a time. In an example embodiment, the method further comprises determining, via the network apparatus, a route based on the new route information; and analyzing, via the network apparatus, route data corresponding to the route based on a high cognitive load model to identify one or more high cognitive load portions of the route. The route data comprises at least one of (a) point of interest (POI) data, (b) entity of interest (EOI) data, or (c) roadway data. In an example embodiment, the method further comprises generating, via the network apparatus, familiarization information for at least one of the one or more high cognitive load portions. The familiarization information comprises (a) familiarization content and (b) a trigger point. The familiarization content is configured to be provided to a user via a user interface of a vehicle apparatus when, based at least in part on a location sensor of the vehicle apparatus, it is determined that the vehicle apparatus has reached the trigger point. In an example embodiment, the method further comprises providing, via the network apparatus, the familiarization information to the vehicle apparatus.

In an example embodiment, the method further comprises determining that the route is an unfamiliar route for the user wherein the route data is analyzed responsive to determining that the route is an unfamiliar route for the user. In an example embodiment, it is determined that the route is an unfamiliar route for the user if a user profile corresponding to the user indicates that at least one of the following is true (a) the user has not previously navigated at least a portion of the route, (b) at least one scenario the user has not previously navigated is present on the route, (c) the user has navigated the route less than a threshold number of times, or (d) user preferences indicate the route should be treated as an unfamiliar route. In an example embodiment, an EOI is formed by linking two or more POIs. In an example embodiment, the POI data or the EOI data comprises at least one dynamic element. In an example embodiment, the analyzing of the route data is based at least in part on the time and the at least one dynamic element. In an example embodiment, the familiarization information is generated based on the high cognitive load model. In an example embodiment, the high cognitive load model is a cognitive navigation model. In an example embodiment, the high cognitive load model is configured to identify a high cognitive load portion of the route and a high cognitive load portion is a portion of a route that is expected to cause the user an increased cognitive load when the user navigates the portion of the route. In an example embodiment, the familiarization content is configured to reduce the user's cognitive load as the user navigates the corresponding high cognitive load portion.

According to another aspect of the present invention, an apparatus is provided. In an example embodiment, the apparatus comprises at least one processor, at least one non-transitory memory storing computer program code, and at least one communications interface configured to communicate via at least one network. The computer program code is configured to, when executed by the at least one processor, cause the apparatus to at least receive new route information; determine a route based on the new route information; analyze route data corresponding to the route based on a high cognitive load model to identify one or more high cognitive load portions of the route; generate familiarization information for at least one of the one or more high cognitive load portions; and provide the familiarization information to the vehicle apparatus. The new route information comprises an origin location, a destination location, and a time. The route data comprises at least one of (a) point of interest (POI) data, (b) entity of interest (EOI) data, or (c) roadway data. The familiarization information comprises (a) familiarization content and (b) a trigger point. The familiarization content is configured to be provided to a user via a user interface of a vehicle apparatus when, based at least in part on a location sensor of the vehicle apparatus, it is determined that the vehicle apparatus has reached the trigger point.

In an example embodiment, the computer program code is further configured to, when executed by the at least one processor, cause the apparatus to at least determine that the route is an unfamiliar route for the user wherein the route data is analyzed responsive to determining that the route is an unfamiliar route for the user. In an example embodiment, it is determined that the route is an unfamiliar route for the user if a user profile corresponding to the user indicates that at least one of the following is true (a) the user has not previously navigated at least a portion of the route, (b) at least one scenario the user has not previously navigated is present on the route, (c) the user has navigated the route less than a threshold number of times, or (d) user preferences indicate the route should be treated as an unfamiliar route. In an example embodiment, an EOI is formed by linking two or more POIs. In an example embodiment, the POI data or the EOI data comprises at least one dynamic element. In an example embodiment, the analyzing of the route data is based at least in part on the time and the at least one dynamic element. In an example embodiment, the familiarization information is generated based on the high cognitive load model. In an example embodiment, the high cognitive load model is a cognitive navigation model. In an example embodiment, the high cognitive load model is configured to identify a high cognitive load portion of the route and a high cognitive load portion is a portion of a route that is expected to cause the user an increased cognitive load when the user navigates the portion of the route.

According to still another aspect of the present invention, a computer program product is provided. In an example embodiment, the computer program product comprising at least one non-transitory computer-readable storage medium having computer-executable program code instructions stored therein. The computer-executable program code instructions comprise program code instructions configured to, when executed by a processor of an apparatus, cause the apparatus to at least receive new route information; determine a route based on the new route information; analyze route data corresponding to the route based on a high cognitive load model to identify one or more high cognitive load portions of the route; generate familiarization information for at least one of the one or more high cognitive load portions; and provide the familiarization information to the vehicle apparatus. The new route information comprises an origin location, a destination location, and a time. The route data comprises at least one of (a) point of interest (POI) data, (b) entity of interest (EOI) data, or (c) roadway data. The familiarization information comprises (a) familiarization content and (b) a trigger point. The familiarization content is configured to be provided to a user via a user interface of a vehicle apparatus when, based at least in part on a location sensor of the vehicle apparatus, it is determined that the vehicle apparatus has reached the trigger point.

In an example embodiment, the computer-executable program code instructions further comprise program code instructions configured to, when executed by a processor of an apparatus, cause the apparatus to at least determine that the route is an unfamiliar route for the user wherein the route data is analyzed responsive to determining that the route is an unfamiliar route for the user. In an example embodiment, it is determined that the route is an unfamiliar route for the user if a user profile corresponding to the user indicates that at least one of the following is true (a) the user has not previously navigated at least a portion of the route, (b) at least one scenario the user has not previously navigated is present on the route, (c) the user has navigated the route less than a threshold number of times, or (d) user preferences indicate the route should be treated as an unfamiliar route. In an example embodiment, an EOI is formed by linking two or more POIs. In an example embodiment, the POI data or the EOI data comprises at least one dynamic element. In an example embodiment, the analyzing of the route data is based at least in part on the time and the at least one dynamic element. In an example embodiment, the familiarization information is generated based on the high cognitive load model. In an example embodiment, the high cognitive load model is a cognitive navigation model. In an example embodiment, the high cognitive load model is configured to identify a high cognitive load portion of the route and a high cognitive load portion is a portion of a route that is expected to cause the user an increased cognitive load when the user navigates the portion of the route.

In accordance with yet another aspect of the present invention, an apparatus is provided. In an example embodiment, the apparatus comprises means for receiving new route information. The new route information comprising an origin location, a destination location, and a time. In an example embodiment, the apparatus comprises means for determining a route based on the new route information. In an example embodiment, the apparatus comprises means for analyzing route data corresponding to the route based on a high cognitive load model to identify one or more high cognitive load portions of the route. The route data comprises at least one of (a) point of interest (POI) data, (b) entity of interest (EOI) data, or (c) roadway data. In an example embodiment, the apparatus further comprises means for generating familiarization information for at least one of the one or more high cognitive load portions. The familiarization information comprises (a) familiarization content and (b) a trigger point. The familiarization content is configured to be provided to a user via a user interface of a vehicle apparatus when, based at least in part on a location sensor of the vehicle apparatus, it is determined that the vehicle apparatus has reached the trigger point. In an example embodiment, the apparatus comprises means for providing the familiarization information to the vehicle apparatus.

In an example embodiment, navigation data is received via a network apparatus comprising at least one processor, at least one memory, and at least one communications interface configured to communicate via at least one network. The navigation data comprises a plurality of point of interest (POI) models. Each POI model is a representation of a POI, including dynamic aspects of the POI. At least a portion of the plurality of POI models are analyzed by the network apparatus based on a data extraction model to determine a link between two or more POIs based on POI models corresponding to the two or more POIs. The two or more POIs are located within a predefined distance of one another. An entity of interest (EOI) model is generated via the network apparatus based on the POI models corresponding to the two or more POIs, the determined link, and the data extraction model. The EOI model is stored via the network apparatus for use in performing one or more navigation functions.

According to an aspect of the present invention, a method for generating, providing, and/or storing EOI models is provided. In an example embodiment, the method comprises receiving, via a network apparatus comprising at least one processor, at least one memory, and at least one communication interface configured to communicate via at least one network, navigation data. The navigation data comprises a plurality of point of interest (POI) models and each POI model is a representation of a POI. In an example embodiment, the method further comprises analyzing, via the network apparatus, at least a portion of the plurality of POI models based on a data extraction model to determine a link between two or more POIs based on POI models corresponding to the two or more POIs. The two or more POIs are located within a predefined distance of one another. The method further comprises generating, via the network apparatus, an entity of interest (EOI) model based on the POI models corresponding to the two or more POIs, the determined link, and the data extraction model; and storing, via the network apparatus, the EOI model for use in performing one or more navigation functions.

In an example embodiment, the link is one or more relationships between the two or more POIs that are determined based on human behavior or interest criteria. In an example embodiment, the data extraction model is a cognitive navigation model and the human behavior or interest criteria is determined by the cognitive navigation model. In an example embodiment, at least one POI model comprises a POI dynamic element and the link between the two or more POIs is based at least in part on the dynamic element. In an example embodiment, the EOI model comprises an EOI dynamic element determined based at least in part on the POI dynamic element. In an example embodiment, the POI dynamic element is updated in real-time or near real-time. In an example embodiment, the EOI model is used to identify a high cognitive load portion of a route.

According to another aspect of the present invention, an apparatus is provided. In an example embodiment, the apparatus comprises at least one processor, at least one non-transitory memory storing computer program code, and at least one communications interface configured to communicate via at least one network. The computer program code is configured to, when executed by the at least one processor, cause the apparatus to at least receive navigation data, the navigation data comprising a plurality of point of interest (POI) models, each POI model being a representation of a POI; analyze at least a portion of the plurality of POI models based on a data extraction model to determine a link between two or more POIs based on POI models corresponding to the two or more POIs, generate an entity of interest (EOI) model based on the POI models corresponding to the two or more POIs, the determined link, and the data extraction model; and store the EOI model for use in performing one or more navigation functions. The two or more POIs are located within a predefined distance of one another.

In an example embodiment, the link is one or more relationships between the two or more POIs that are determined based on human behavior or interest criteria. In an example embodiment, the data extraction model is a cognitive navigation model and the human behavior or interest criteria is determined by the cognitive navigation model. In an example embodiment, at least one POI model comprises a POI dynamic element and the link between the two or more POIs is based at least in part on the dynamic element. In an example embodiment, the EOI model comprises an EOI dynamic element determined based at least in part on the POI dynamic element. In an example embodiment, the POI dynamic element is updated in real-time or near real-time. In an example embodiment, the EOI model is used to identify a high cognitive load portion of a route.

In accordance with still another aspect of the present invention, a computer program product is provided. The computer program product comprises at least one non-transitory computer-readable storage medium having computer-executable program code instructions stored therein. The computer-executable program code instructions comprising program code instructions configured to, when executed by a processor of an apparatus, cause the apparatus to at least receive navigation data, the navigation data comprising a plurality of point of interest (POI) models, each POI model being a representation of a POI; analyze at least a portion of the plurality of POI models based on a data extraction model to determine a link between two or more POIs based on POI models corresponding to the two or more POIs, generate an entity of interest (EOI) model based on the POI models corresponding to the two or more POIs, the determined link, and the data extraction model; and store the EOI model for use in performing one or more navigation functions. The two or more POIs are located within a predefined distance of one another.

In an example embodiment, the link is one or more relationships between the two or more POIs that are determined based on human behavior or interest criteria. In an example embodiment, the data extraction model is a cognitive navigation model and the human behavior or interest criteria is determined by the cognitive navigation model. In an example embodiment, at least one POI model comprises a POI dynamic element and the link between the two or more POIs is based at least in part on the dynamic element. In an example embodiment, the EOI model comprises an EOI dynamic element determined based at least in part on the POI dynamic element. In an example embodiment, the POI dynamic element is updated in real-time or near real-time. In an example embodiment, the EOI model is used to identify a high cognitive load portion of a route.

In still another aspect of the present invention, an apparatus is provided. In an example embodiment, the apparatus comprises means for receiving navigation data. The navigation data comprises a plurality of point of interest (POI) models and each POI model is a representation of a POI. In an example embodiment, the apparatus further comprises means for analyzing at least a portion of the plurality of POI models based on a data extraction model to determine a link between two or more POIs based on POI models corresponding to the two or more POIs. The two or more POIs are located within a predefined distance of one another. In an example embodiment, the apparatus further comprises means generating an entity of interest (EOI) model based on the POI models corresponding to the two or more POIs, the determined link, and the data extraction model. In an example embodiment, the apparatus further comprises means for storing the EOI model for use in performing one or more navigation functions.

In an example embodiment, at least one of (a) user behavior data or (b) driver questionnaire data is received via a network apparatus comprising at least one processor, at least one memory, and at least one communications interface configured to communicate via at least one network. In an example embodiment, navigation information comprising at least one of (a) point of interest (POI) data, (b) entity of interest (EOI) data, or (c) roadway data is received via the network apparatus. In an example embodiment, the navigation information is analyzed via the network apparatus based on the at least one of (a) user behavior data or (b) driver questionnaire data to identify at least one navigation scenario that is expected, based on the at least one of (a) user behavior data or (b) driver questionnaire data, to cause a user to have an increased cognitive load when navigating the navigation scenario. Scenario information for the at least one navigation scenario is generated via the network apparatus. The scenario information comprises at least one of (a) scenario identifying information configured for identifying portions of a route that match the navigation scenario or (b) information for generating familiarization information for a portion of a route matching the navigation scenario. The scenario information is used to perform at least one of (a) identify a high cognitive load portion of a route by matching a portion of the route to the navigation scenario based on the scenario identifying information or (b) generate familiarization information for the high cognitive load portion based on the information for generating familiarization information.

According to an aspect of the present invention, a method for generating and/or providing scenario information for the identification of high cognitive load portions is provided. In an example embodiment, the method comprises receiving, via a network apparatus comprising at least one processor, at least one memory, and at least one communications interface configured to communicate via at least one network, at least one of (a) user behavior data or (b) driver questionnaire data. In an example embodiment, the method further comprises receiving, via the network apparatus, navigation information comprising at least one of (a) point of interest (POI) data, (b) entity of interest (EOI) data, or (c) roadway data. In an example embodiment, the method further comprises analyzing, via the network apparatus, the navigation information based on the at least one of (a) user behavior data or (b) driver questionnaire data to identify at least one navigation scenario that is expected, based on the at least one of (a) user behavior data or (b) driver questionnaire data to cause a user to have an increased cognitive load when navigating the navigation scenario. In an example embodiment, the method further comprises generating, via the network apparatus, scenario information for the at least one navigation scenario, the scenario information comprising at least one of (a) scenario identifying information configured for identifying portions of a route that match the navigation scenario or (b) information for generating familiarization information for a portion of a route matching the navigation scenario. The scenario information is used to perform at least one of (a) identify a high cognitive load portion of a route by matching a portion of the route to the navigation scenario based on the scenario identifying information or (b) generate familiarization information for the high cognitive load portion based on the information for generating familiarization information.

In an example embodiment, at least one of (a) the identification of at least one navigation scenario or (b) the scenario information is personalized for an individual user or a class of users. In an example embodiment, a class of users is a group of users having at least one attribute in common. In an example embodiment, the navigation information is analyzed by and the scenario information is generated by a dynamic model creation engine and the dynamic model creation engine is trained via machine learning based at least in part on the at least one of (a) user behavior data or (b) driver questionnaire data. In an example embodiment, the dynamic model creation engine is personalized for an individual user by training the dynamic model creation engine using the at least one of (a) user behavior data or (b) driver questionnaire data corresponding to the individual user. In an example embodiment, the dynamic model creation engine is personalized for a class of users by training the dynamic model creation engine using the at least one of (a) user behavior data or (b) driver questionnaire data corresponding to users of the class of users. In an example embodiment, users of the class of users are grouped based on at least one of age of the users, driving experience of the users, number of years the users have been driving, driving behavior of the users, or user preferences.

According to another aspect of the present invention, an apparatus is provided. In an example embodiment, the apparatus comprises at least one processor, at least one non-transitory memory storing computer program code, and at least one communications interface configured to communicate via at least one network. The computer program code is configured to, when executed by the at least one processor, cause the apparatus to at least receive at least one of (a) user behavior data or (b) driver questionnaire data; receive navigation information comprising at least one of (a) point of interest (POI) data, (b) entity of interest (EOI) data, or (c) roadway data; analyze the navigation information based on the at least one of (a) user behavior data or (b) driver questionnaire data to identify at least one navigation scenario that is expected, based on the at least one of (a) user behavior data or (b) driver questionnaire data to cause a user to have an increased cognitive load when navigating the navigation scenario; and generate scenario information for the at least one navigation scenario, the scenario information comprising at least one of (a) scenario identifying information configured for identifying portions of a route that match the navigation scenario or (b) information for generating familiarization information for a portion of a route matching the navigation scenario. The scenario information is used to perform at least one of (a) identify a high cognitive load portion of a route by matching a portion of the route to the navigation scenario based on the scenario identifying information or (b) generate familiarization information for the high cognitive load portion based on the information for generating familiarization information.

In an example embodiment, at least one of (a) the identification of at least one navigation scenario or (b) the scenario information is personalized for an individual user or a class of users. In an example embodiment, a class of users is a group of users having at least one attribute in common. In an example embodiment, the navigation information is analyzed by and the scenario information is generated by a dynamic model creation engine and the dynamic model creation engine is trained via machine learning based at least in part on the at least one of (a) user behavior data or (b) driver questionnaire data. In an example embodiment, the dynamic model creation engine is personalized for an individual user by training the dynamic model creation engine using the at least one of (a) user behavior data or (b) driver questionnaire data corresponding to the individual user. In an example embodiment, the dynamic model creation engine is personalized for a class of users by training the dynamic model creation engine using the at least one of (a) user behavior data or (b) driver questionnaire data corresponding to users of the class of users. In an example embodiment, users of the class of users are grouped based on at least one of age of the users, driving experience of the users, number of years the users have been driving, driving behavior of the users, or user preferences.

According to still another aspect of the present invention, a computer program product is provided. In an example embodiment, the computer program product comprises at least one non-transitory computer-readable storage medium having computer-executable program code instructions stored therein. The computer-executable program code instructions comprise program code instructions configured to, when executed by a processor of an apparatus, cause the apparatus to at least receive at least one of (a) user behavior data or (b) driver questionnaire data; receive navigation information comprising at least one of (a) point of interest (POI) data, (b) entity of interest (EOI) data, or (c) roadway data; analyze the navigation information based on the at least one of (a) user behavior data or (b) driver questionnaire data to identify at least one navigation scenario that is expected, based on the at least one of (a) user behavior data or (b) driver questionnaire data to cause a user to have an increased cognitive load when navigating the navigation scenario; and generate scenario information for the at least one navigation scenario, the scenario information comprising at least one of (a) scenario identifying information configured for identifying portions of a route that match the navigation scenario or (b) information for generating familiarization information for a portion of a route matching the navigation scenario. The scenario information is used to perform at least one of (a) identify a high cognitive load portion of a route by matching a portion of the route to the navigation scenario based on the scenario identifying information or (b) generate familiarization information for the high cognitive load portion based on the information for generating familiarization information.

In an example embodiment, at least one of (a) the identification of at least one navigation scenario or (b) the scenario information is personalized for an individual user or a class of users. In an example embodiment, a class of users is a group of users having at least one attribute in common. In an example embodiment, the navigation information is analyzed by and the scenario information is generated by a dynamic model creation engine and the dynamic model creation engine is trained via machine learning based at least in part on the at least one of (a) user behavior data or (b) driver questionnaire data. In an example embodiment, the dynamic model creation engine is personalized for an individual user by training the dynamic model creation engine using the at least one of (a) user behavior data or (b) driver questionnaire data corresponding to the individual user. In an example embodiment, the dynamic model creation engine is personalized for a class of users by training the dynamic model creation engine using the at least one of (a) user behavior data or (b) driver questionnaire data corresponding to users of the class of users. In an example embodiment, users of the class of users are grouped based on at least one of age of the users, driving experience of the users, number of years the users have been driving, driving behavior of the users, or user preferences.

BRIEF DESCRIPTION OF THE DRAWINGS

Figure 1:
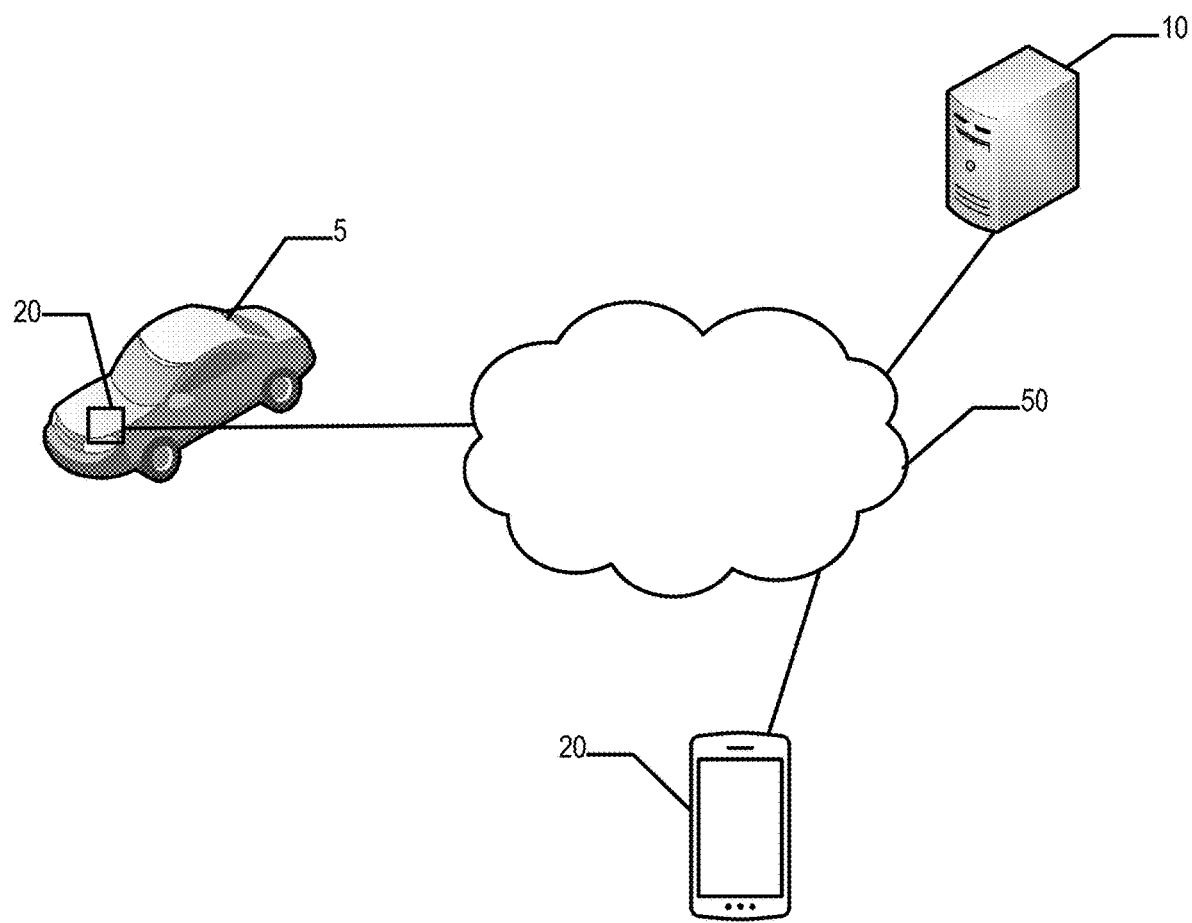
Figure 2A:
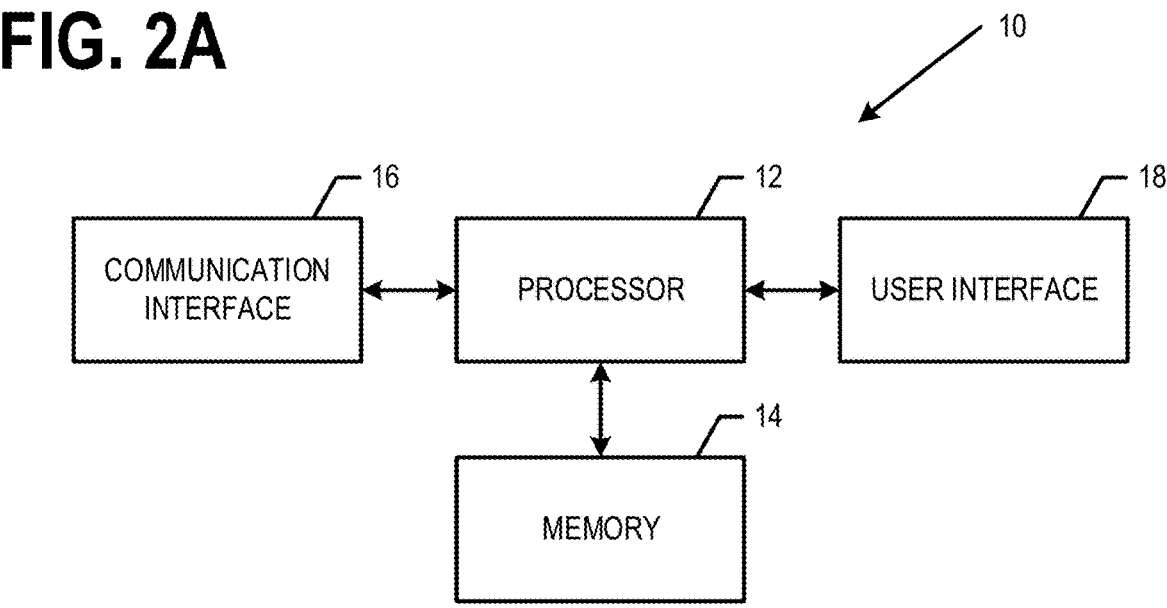
Figure 2B:
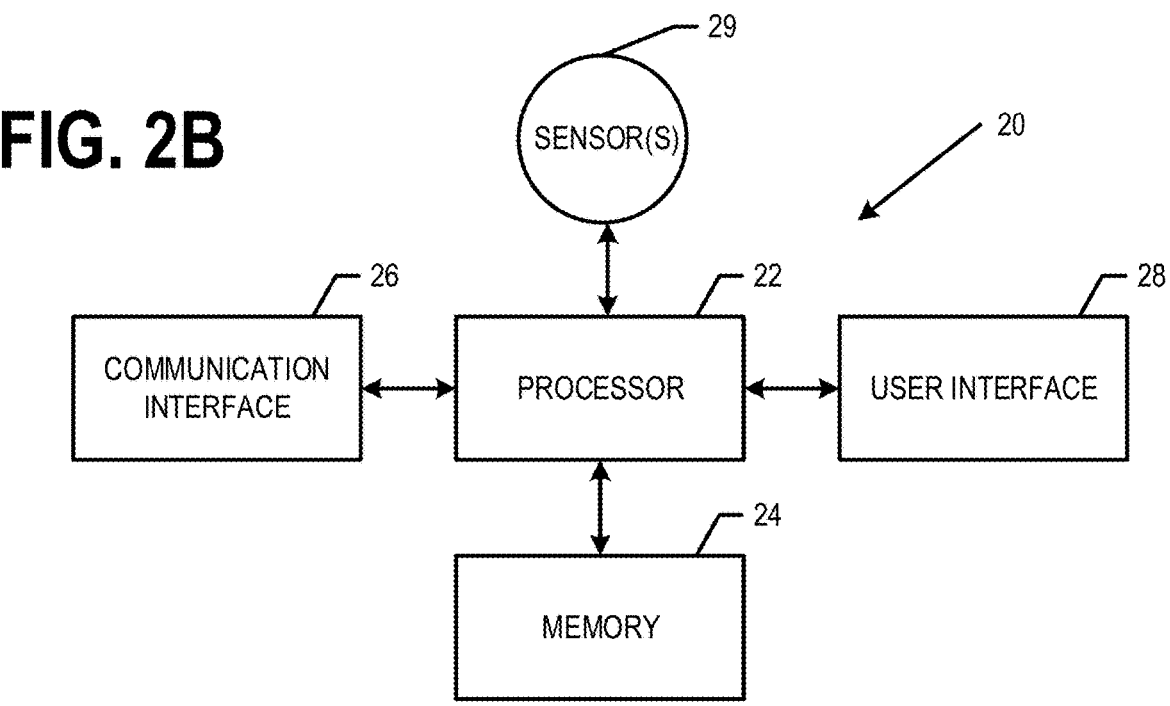
Figure 3:
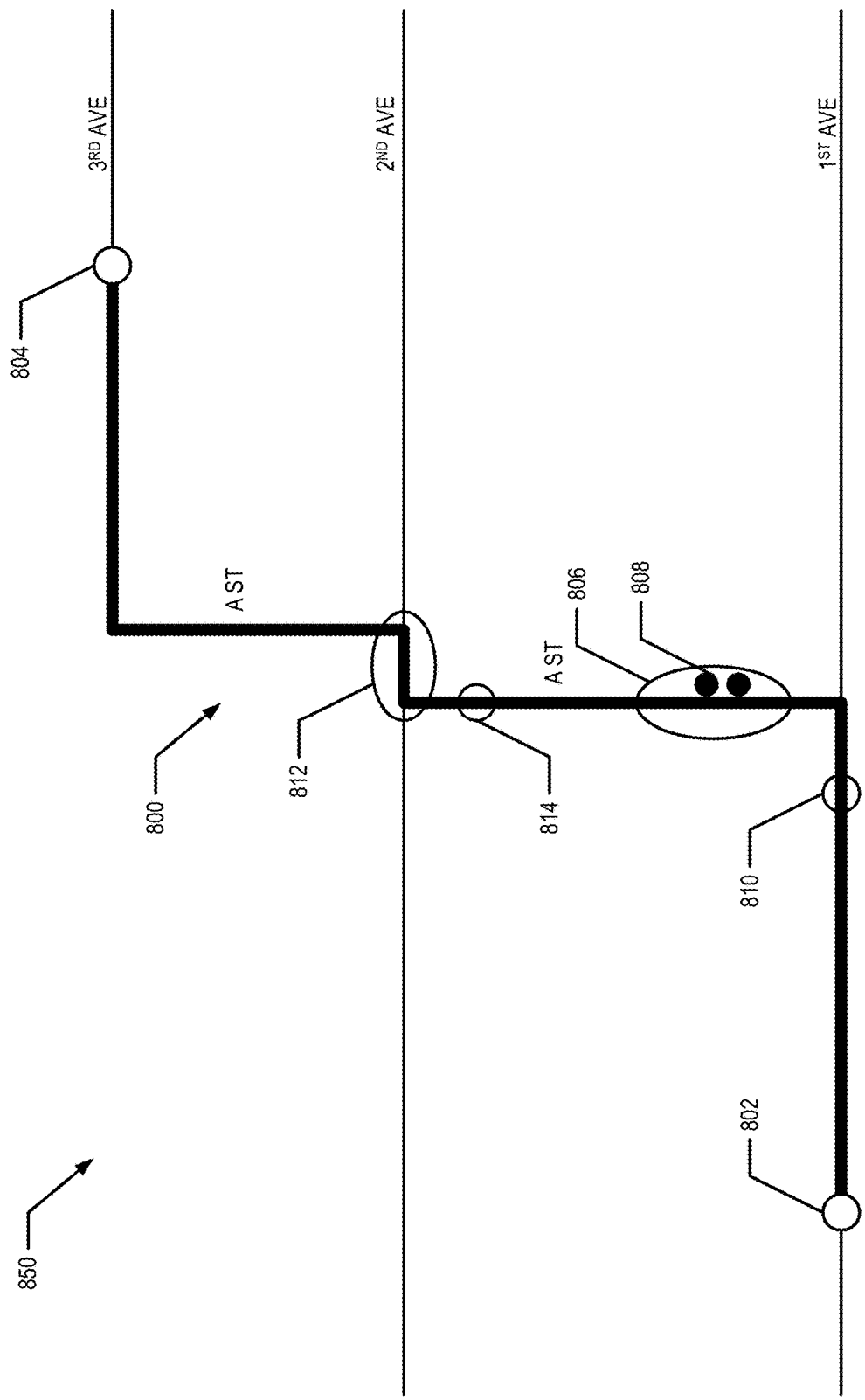
Figure 4:
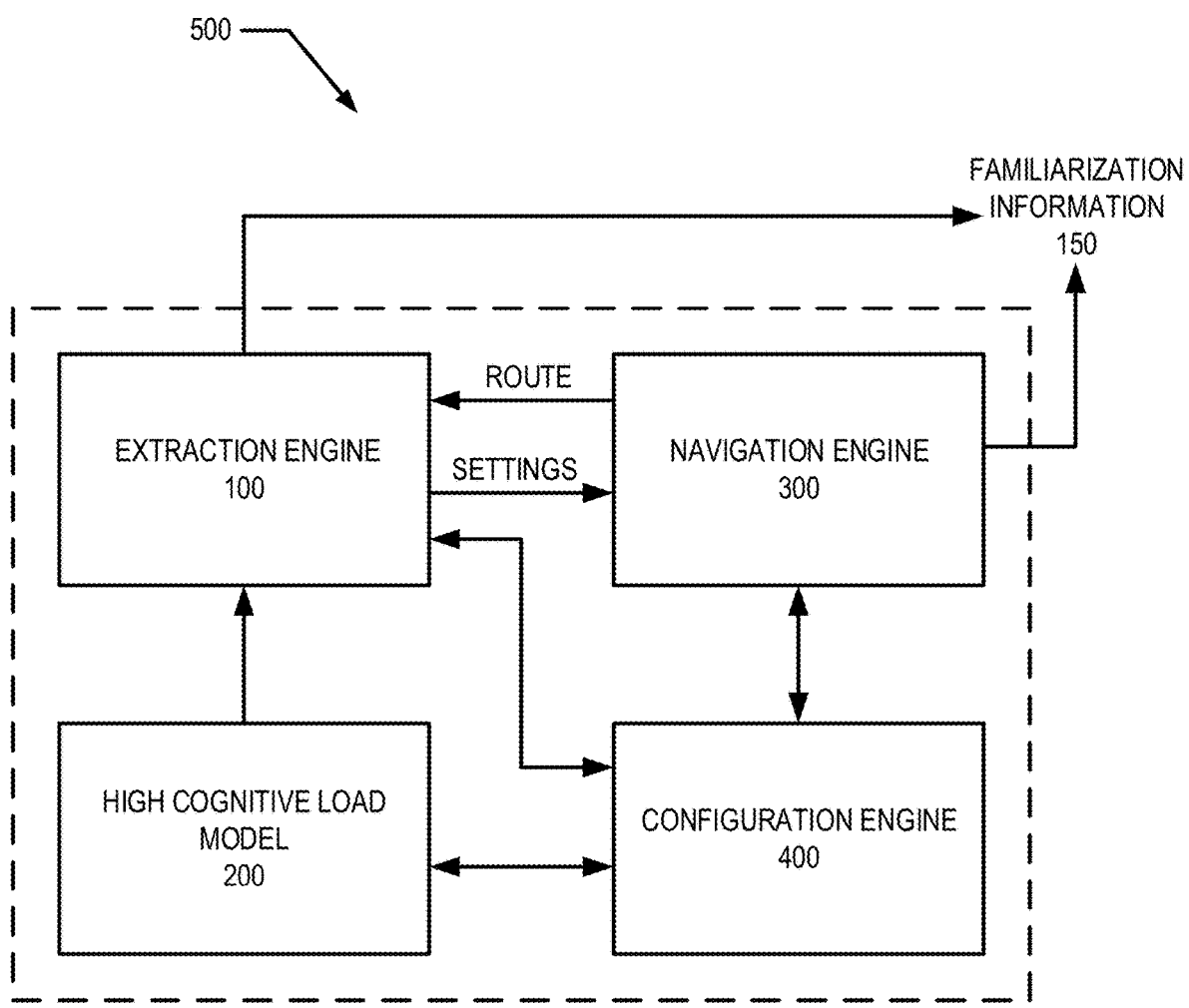
Figure 5:
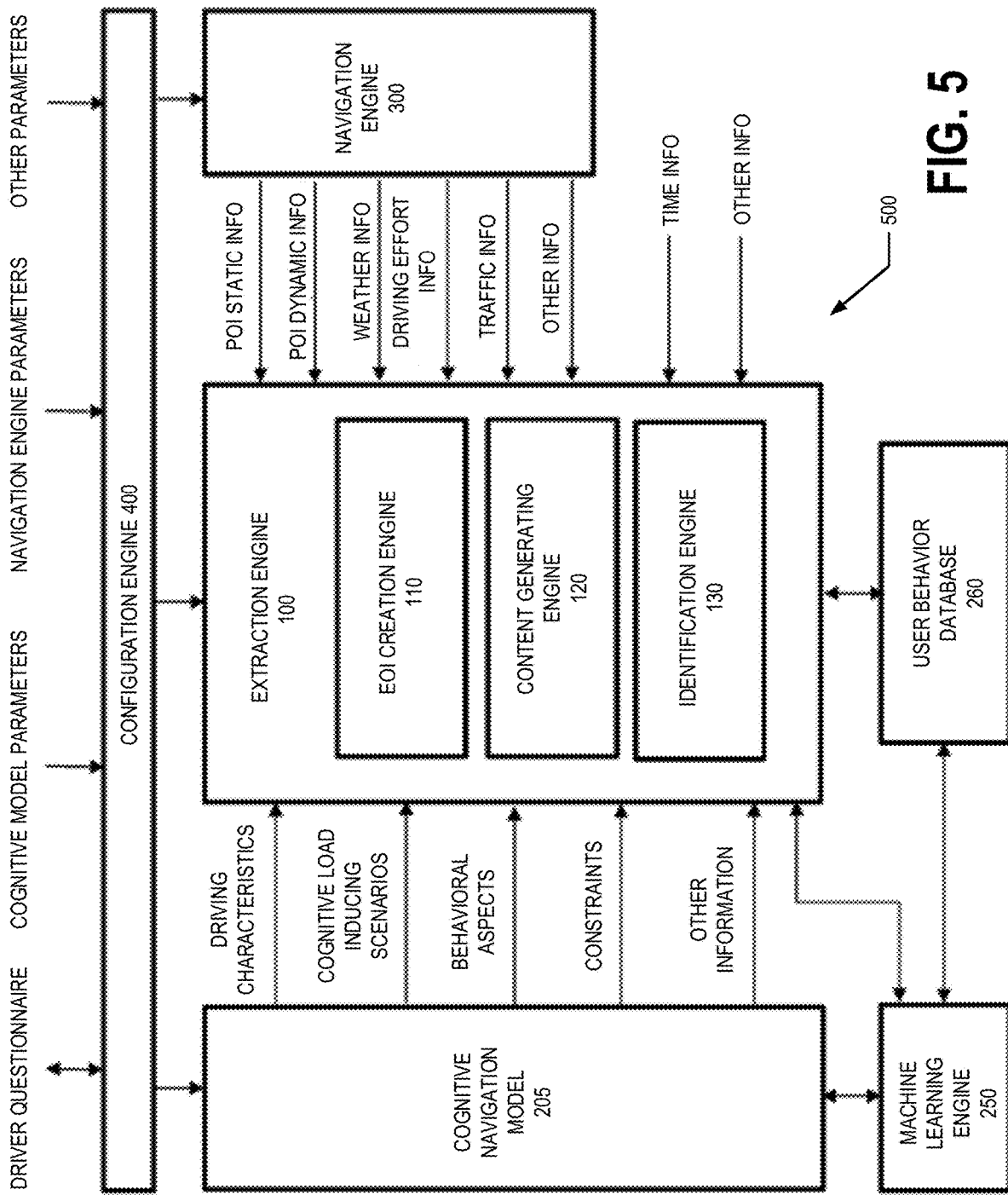
Figure 6:
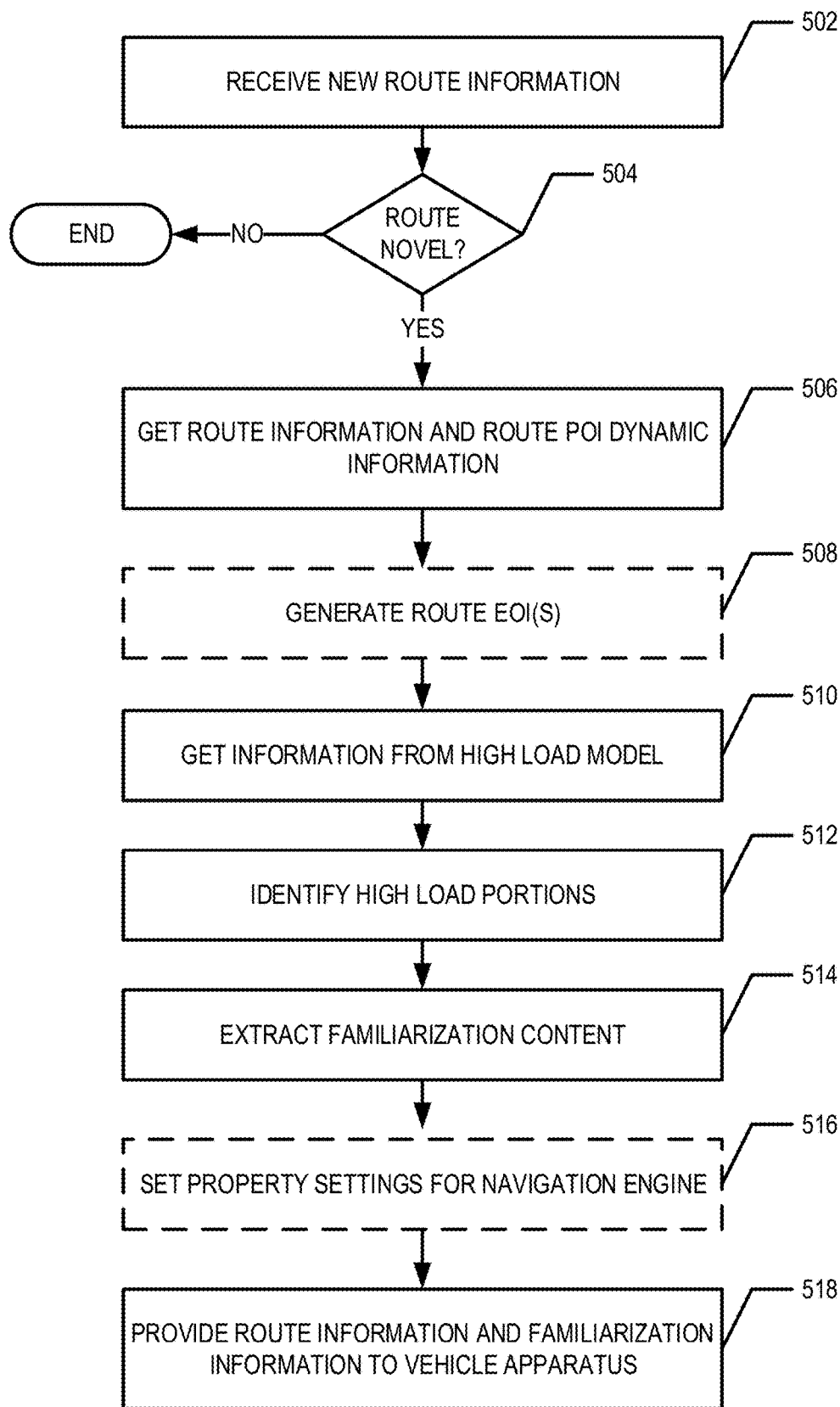
Figure 7:
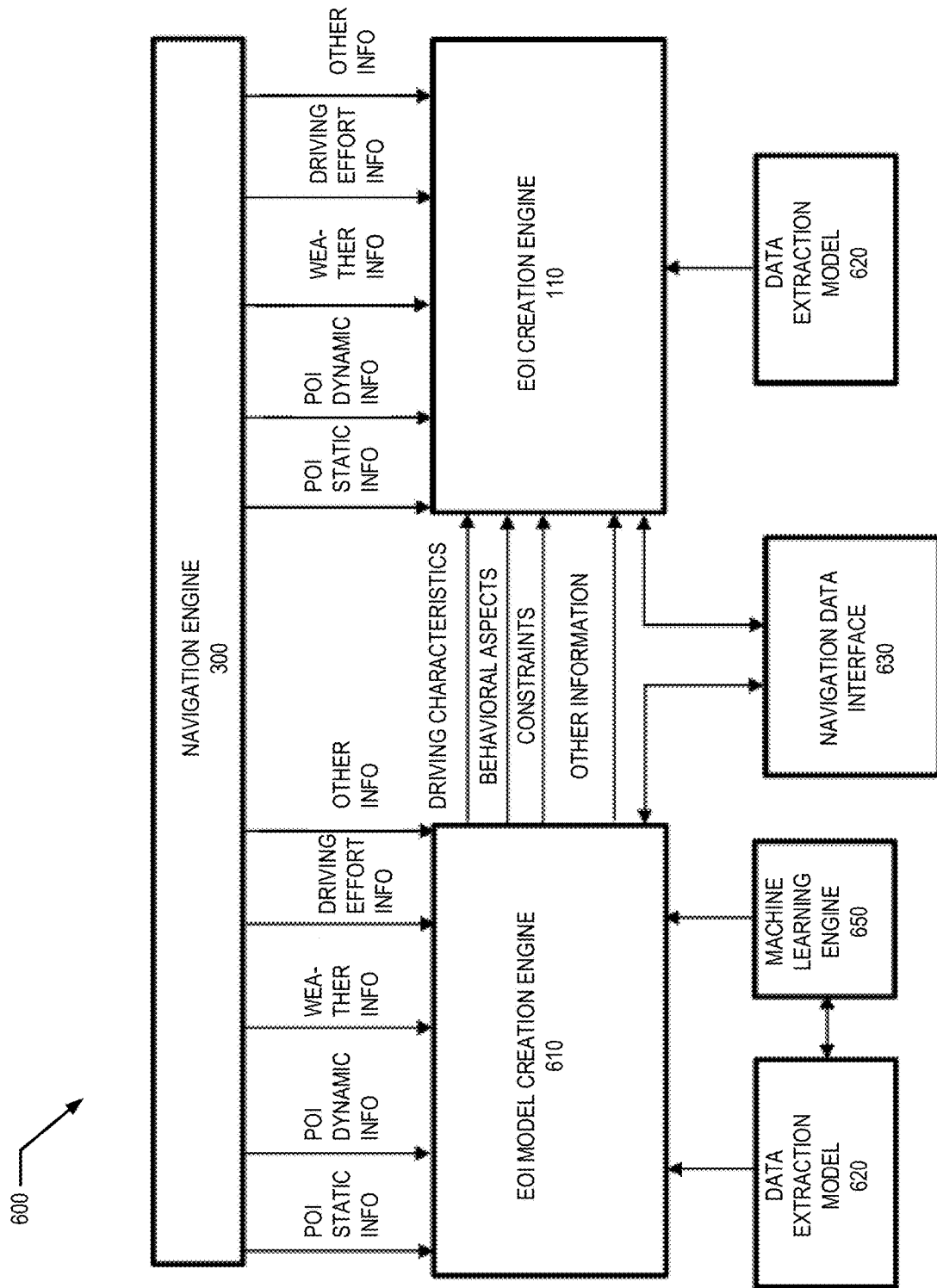
Figure 8:
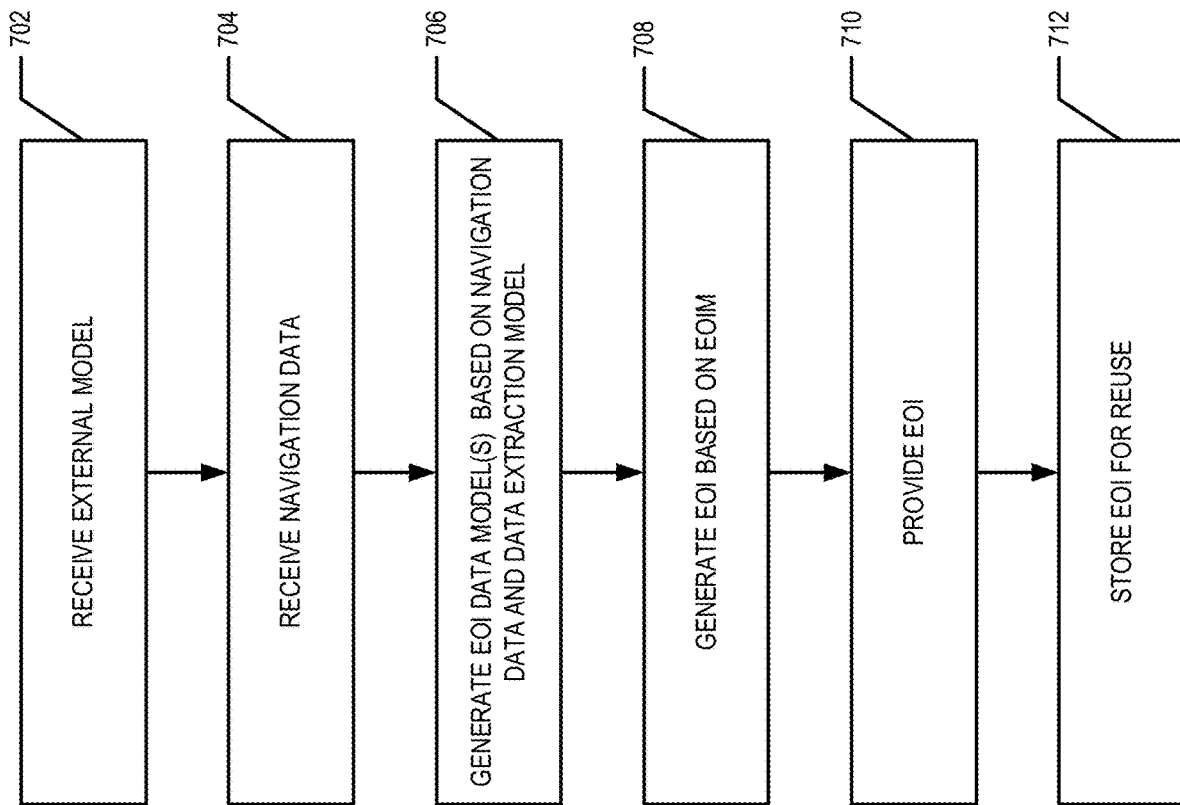
Figure 9:
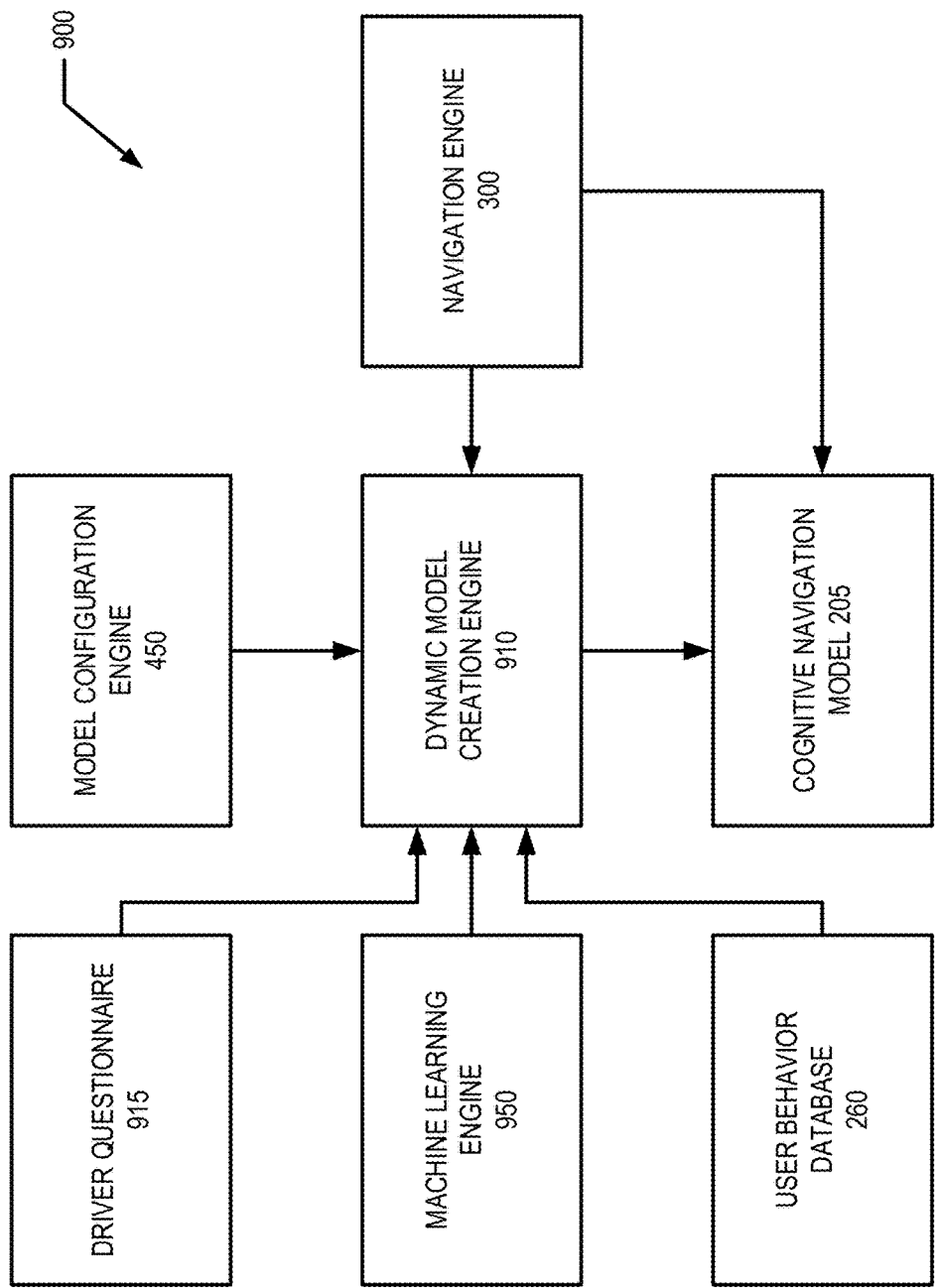

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment;

FIG. 2B is a block diagram of a vehicle apparatus that may be specifically configured in accordance with an example embodiment;

FIG. 3 is a schematic diagram illustrating a route, portions of the route associated with increased cognitive load, and trigger points corresponding to the portions of the route associated with increased cognitive load, according to an example embodiment;

FIG. 4 is a block diagram of a familiarization system configured to generate familiarization information/data, in accordance with an example embodiment;

FIG. 5 is another block diagram of a familiarization system configured to generate familiarization information/data, in accordance with an example embodiment;

FIG. 6 is a flowchart illustrating operations performed, such as by the network apparatus of FIG. 2A to provide a familiarization information/data, in accordance with an example embodiment;

FIG. 7 is a block diagram of an EOI generation system configured to generate EOIs and populate corresponding EOI information/data, according to an example embodiment;

FIG. 8 is a flowchart illustrating operations performed, such as by the network apparatus of FIG. 2A to generate EOIs and populate the corresponding EOI information/data;

FIG. 9 provides a block diagram of an example model generation system, in accordance with an example embodiment; and FIG. 10 provides a flowchart illustrating operations performed, such as by the network apparatus of FIG. 2A, to generate and provide a cognitive navigation model for use in determining and providing a user with familiarization content as a user navigates a route.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, systems, and computer program products are provided in accordance with an example embodiment for providing familiarization content to a user. For example, one or more portions of a route that is unfamiliar and/or novel to a user and that may cause an increase in cognitive load when a user navigates (e.g., operates/drives a vehicle along) those portions of the route may be identified and/or determined. For example, portions of a route associated with increased cognitive load for a user (referred to as high cognitive load portions herein) may be identified and/or determined. In an example embodiment, high cognitive load portions of a route may be identified and/or determined using a human cognitive navigation model. Familiarization information/data regarding the one or more high cognitive load portions is extracted and/or generated based on route information/data and/or EOI information/data corresponding to the corresponding portion of the route. The familiarization information/data comprises familiarization content configured to be provided to a user to familiarize the user with a high cognitive load portion of the route such that the user may navigate the high cognitive load portion with a decrease in cognitive load compared to navigating the high cognitive load portion without receiving the familiarization content. The familiarization content may be provided to a user traveling along the route (e.g., operating/driving a vehicle along the route) at trigger points that are locations and/or times along the route prior to the user reaching the corresponding portion of the route associated with increased cognitive load. In various embodiments, the familiarization content is optimum familiarization content that is optimized to minimize the cognitive load experienced by the user as the user navigates the corresponding high cognitive load portion.

Methods, apparatus, systems, and computer program products are provided in accordance with an example embodiment for generating EOIs and populating corresponding EOI information/data. In an example embodiment, an EOI is an entity generated by linking two or more POIs. In various embodiments, the linking between the two or more POIs may be dynamic and/or time dependent. In various embodiments, the two or more POIs of an EOI are linked via a relationship determined based on human behavior and/or interest criteria and are within a predefined distance of one another. Various embodiments relate to generation and/or use of EOIs in determining and/or providing navigation information/data, familiarization information/data, and/or the like. For example, in an example embodiment, and EOI located along a route may be a source of increased cognitive load for a user navigating along the route.

Methods, apparatus, systems, and computer program products are provided in accordance with an example embodiment for generating and updating a high cognitive load model. In various embodiments, a high cognitive load model is configured to identify navigation scenarios that are likely to cause a user's cognitive load to increase when the user is navigating a portion of a route corresponding to and/or matching the navigation scenario. For example, the high cognitive load model may generate scenario information/data and/or scenario templates corresponding to navigation scenarios that are likely to cause a user's cognitive load to be increased when navigating the navigation scenarios (referred to herein as high load navigation scenarios). In various embodiments, the scenario information/data and/or scenario templates may be used to identify high cognitive load portions of a route and to determine, generate, and/or extract familiarization information/data (e.g., including familiarization content) for the identified high cognitive load portions. In various embodiments, the high cognitive load model is a human cognitive navigation model configured for modeling human cognitive processing in various navigation scenarios. In an example embodiment, the cognitive navigation model is trained using navigation information/data, user behavior information/data, and/or feedback directly from one or more users (e.g., a user questionnaire). In an example embodiment, the cognitive navigation model is trained using machine learning with support from a machine learning engine.

FIG. 1 provides an illustration of an example system that can be used in conjunction with various embodiments of the present invention. As shown in FIG. 1, the system may include one or more network apparatuses 10, one or more vehicle apparatuses 20 (e.g., 20A, 20B), wherein each vehicle apparatus 20 is disposed on a vehicle 5, one or more networks 50, and/or the like.

In various embodiments, the vehicle apparatus 20, may be an in vehicle navigation system, vehicle control system, a mobile computing device, a mobile data gathering platform, and/or the like. For example, a vehicle apparatus 20 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the vehicle apparatus 20 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, the vehicle apparatus 20 is configured to autonomously drive a vehicle 5 and may perform multiple functions that are similar to those performed by a vehicle apparatus 20 configured to be an ADAS (e.g., lane keeping, lane change assistance, maintaining a lane, merging, etc.). In some embodiments, vehicle apparatus 20 may be onboard a personal vehicle, commercial vehicle, public transportation vehicle, fleet vehicle, and/or other vehicle. In various embodiments, the vehicle apparatus 20 may be a smartphone, tablet, personal digital assistant (PDA), personal computer, desktop computer, laptop, and/or other mobile computing device. In an example embodiment, a vehicle apparatus 20 is onboard a vehicle 5 and is used to perform one or more navigation functions corresponding to the vehicle 5 traversing at least a portion of a road network. Some non-limiting examples of navigation functions are localization, route determination, lane level route determination, lane maintenance, route guidance, lane level route guidance, provision of traffic information/data, provision of lane level traffic information/data, determination and/or provision of route familiarization content, and/or the like.

In an example embodiment, the network apparatus 10 may be a server, group of servers, distributed computing system, and/or other computing system. For example, the network apparatus 10 may be in communication with one or more vehicle apparatuses 20, and/or the like via one or more wired and/or wireless networks 50.

In an example embodiment, a network apparatus 10 may comprise components similar to those shown in the example network apparatus 10 diagrammed in FIG. 2A. In an example embodiment, the network apparatus 10 is configured to receive trip and/or route information/data from a user apparatus 20, identify and/or generate EOIs and populate corresponding EOI information/data, identify portions of a route associated with increased cognitive load for a user, extract and/or generate familiarization information/data for a route, provide a route and/or familiarization information/ data for a route to a user apparatus 20, and/or the like. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory.

In various embodiments, a vehicle apparatus 20 is configured to provide a user with an interactive user interface (e.g., via the user interface of the vehicle apparatus 20), receive user input indicating and/or selecting a trip and/or a route, provide trip and/or route information/data to a network apparatus 10, receive route information/data and/or familiarization information/data from the network apparatus 10, provide familiarization content to user at appropriate points along a route, and/or the like. In an example embodiment, as shown in FIG. 2B, the vehicle apparatus 20 may comprise a processor 22, memory 24, a communications interface 26, a user interface 28, one or more location sensors 29 (e.g., a GNSS sensor; IMU sensors; an odometry system, and/or the like) and/or other components configured to perform various operations, procedures, functions or the like described herein. For example, in an example embodiment, a vehicle apparatus 20 may comprise further sensors such as, for example, a camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 20 to determine one or more features of the corresponding vehicle's 5 surroundings and/or monitor the vehicle's 5 operating parameters). In at least some example embodiments, the memory 24 is non-transitory.

In an example embodiment, the network apparatus 10 may be in communication with one or more of vehicle apparatuses 20 via one or more wired and/or wireless networks 50. For example, each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, short and/or medium range communications, and/or the like. In some embodiments, a network 50 may comprise the automotive cloud, digital transportation infrastructure (DTI), radio data system (RDS)/high definition (HD) radio or other digital radio system, and/or the like. For example, a vehicle apparatus 20 may be in communication with a network apparatus 10 via the network 50. For example, a vehicle apparatus 20 may communicate with the network apparatus 10 via a network, such as the Cloud. For example, the Cloud may be a computer network that provides shared computer processing resources and data to computers and other devices connected thereto.

Certain example embodiments of the network apparatus 10 and/or vehicle apparatus 20 are described in more detail below with respect to FIGS. 2A and 2B.

II. Example Operation

Example embodiments provide methods, apparatus, systems, computer program products, and/or the like for providing a user (e.g., an operator/driver of a vehicle 5) with familiarization information/data for portions of an unfamiliar and/or novel route that are associated with increased levels of cognitive load (e.g., high cognitive load portions of the route). In an example embodiment, familiarization information/data comprises familiarization content. The familiarization content comprises information/data configured to be provided visually, audibly, and/or haptically to a user as the user navigates an unfamiliar and/or novel route and is configured to familiarize a user with the corresponding high cognitive load portion of the route such that the user's cognitive load while navigating the corresponding portion of the route is decreased compared to if the familiarization content was not provided to the user. In various embodiments, an unfamiliar and/or novel route is a route that, according to a user profile corresponding to the user, at least a portion of the route has not been previously navigated by the user; when a new scenario (e.g., construction, different time of day, a different day of the week than when the user usually navigates and/or has previously navigated the route, different weather conditions than when the user has previously navigated the route, and/or the like); a route that the user has navigated only a few times (e.g., a number of times that satisfies a novelty threshold requirement); and/or route that user preferences stored in association with a user profile corresponding to the user indicate that the route should be considered unfamiliar and/or novel.

Cognitive load refers to the effort being used in the working memory of a user. For example, when a user experiences an increased cognitive load, the user is having to put greater effort into the use of working memory. Working memory is a human cognitive system with a limited capacity that is responsible for temporarily holding information available for processing by the human brain. A heavy cognitive load typically creates error or some kind of interference in the task at hand (e.g., operating/driving a vehicle 5). Thus, various embodiments of the present invention provide familiarization content to a user (e.g., an operator/driver of a vehicle 5) as the user navigates an unfamiliar and/or novel route so as to reduce the user's overall cognitive load such to enable the user to maximize the amount of processing that may be focused on the task at hand (e.g., operating/driving the vehicle 5). For example, the familiarization content for an example high cognitive load portion may comprise the text "take next right and the immediate left after 200 meters, which is followed by an immediate signal," rather than merely instructing the user to "take the next right and then take the first left." In another example, the familiarization content for an example high cognitive load portion may comprise the text "use caution—entering area with heavy pedestrian traffic including children."

In various embodiments, EOIs may be determined and/or generated for use in identifying portions of a route that are associated with increased cognitive load. For example, an EOI may be determined and/or generated by identifying a link between two or more POIs. In an example, the link may be a dynamic link. As used herein, a dynamic link is a link between two or more POIs that is determined and/or identified based on one or more dynamic elements of at least one of the two or more POIs. As used herein, a dynamic element is an element or field (e.g., and/or set of associated/linked fields) of an instance of POI (and/or EOI) information/data that is time dependent. In various embodiments, the time dependence may be dependent on time of day, day of the week, calendar date, month, year, season, time of year, whether the day is a holiday or not, and/or other time dependent characteristic.

In various embodiments, high cognitive load portions of a route are determined and/or identified based on a user profile corresponding to the user, a classification associated with the user (e.g., a classification and/or class identifier stored in the user profile), and/or the like. In an example embodiment, determined and/or identified high cognitive load portions of a route are universal among various users (e.g., not user dependent). In various embodiments, the high cognitive load portions of a route are determined and/or identified based on a human cognitive navigation model. In an example embodiment, a human cognitive navigation model is human cognitive model trained (e.g., via machine learning) for modeling human cognitive patterns that relate to navigation.

Providing Familiarization Information/Data

In various embodiments, familiarization information/data comprises familiarization content that is configured to be provided to a user navigating an unfamiliar and/or novel route to reduce the user's cognitive load while navigating high cognitive load portions of the route. As used herein a high cognitive load portion of a route is a portion of a route that is associated with increased cognitive load for a user navigating the route (e.g., operating/driving a vehicle along the route). In various embodiments, an instance of familiarization information/data corresponds to a high cognitive load portion and comprises a trigger point and text, graphics, a template for generating text and/or graphics, and/or the like to be provided to a user (e.g., via an IUI provided via the user interface 28 of a vehicle apparatus 20), computer executable instructions for generating and/or providing text, graphics and/or the like to be provided to a user, and/or the like. In an example embodiment, an instance of familiarization information/data comprises (a) a location of a high cognitive load portion (e.g., identifying the location at which a user will enter a high cognitive load portion along the route, designating a section of the route as a high cognitive load portion, and/or the like), (b) a trigger point (e.g., a particular location along the route at which the familiarization content should be provided to the user and/or a particular amount of time before the user is expected to reach the high cognitive load portion at which the warning and/or alert should be provided to the user), (c) the familiarization content to be provided to the user via the user interface 28 (e.g., text to be audibly provided to a user, text and/or graphics to be visually provided to the user, and/or the like), and/or the like. In an example embodiment, the familiarization information/data further comprises one or more settings modifications. In an example embodiment, a settings modification may be an instruction (e.g., computer-executable instruction) that causes one or more settings of the vehicle apparatus 20 to be updated. For example, one or more settings of a navigation application operating on the vehicle apparatus 20 (e.g., the application causing the IUI to the user via the user interface 28) may be updated and/or modified. In an example embodiment, the navigation engine 300 and/or navigation application operating on the vehicle apparatus 20 may be configured to manage, update, modify, and/or the like one or more operating parameters of the vehicle 5 (e.g., braking responsiveness, handling responsiveness, daytime running lights and/or headlight operation, driving mode, and/or the like) based on the settings modifications.

FIG. 3 illustrates a portion of a road network 850 comprising a route 800. In an example embodiment, a route 800 corresponds to a particular trip, wherein a particular trip is defined by an origin location, a destination location, and a time (e.g., a date/time of arrival, a date/time of departure, a date/time when the user is expected to be located at a particular position along a route from the origin location to the destination location, and/or the like). The route 800 extends from an origin location 802 to a destination location 804 and comprises two high cognitive load portions 806 and 812. High cognitive load portion 806 corresponds to EOI 808 and high cognitive load portion 812 corresponds to a portion of the route with high driving difficulty (e.g., where A Street dog-legs across Second Avenue). In an example embodiment, familiarization content corresponding to high cognitive load portion 806 is visually, audibly, and/or haptically provided to the user (via the user interface 28 of the vehicle apparatus 20) when the user (e.g., as determined by a location sensor 29 of the vehicle apparatus 20) is located at and/or has passed through trigger point 810. For example, when the user (e.g., as determined by a location sensor 29 of the vehicle apparatus 20) is located at and/or has passed through trigger point 810, the vehicle apparatus 20 may use a speaker of the user interface 28 (and/or of the vehicle 5) to audibly provide the user with a warning and/or alert regarding approaching the EOI 808 and indicating actions a user should take (be alert, be aware that a large number of pedestrians may be crossing the street, be aware that children may be walking on the sidewalk, and/or the like). As should be understood, the warning and/or alert is tailored to the corresponding high cognitive load portion and/or extracted from EOI and/or route information/data (e.g., map information/data corresponding to the links, nodes, intersections, road geometry, road topology, POIs, EOIs and/or the like along the route) for the corresponding high cognitive load portion. The trigger point corresponding to high cognitive load portion 812 is designated as trigger point 814. In various embodiments, a trigger point may be a particular location along a route (e.g., 100 meters, 500 meters, 1000 meters, 1500 meters, 2000 meters and/or the like before the corresponding high cognitive load portion) or a particular time period ahead of when a user is expected to reach the corresponding high cognitive load portion (e.g., 30 seconds, one minute, ninety seconds, two minutes, five minutes, and/or the like before the user is expected to reach the high cognitive load portion). In an example embodiment, the particular location or the particular time period may depend on a classification (EOI, road geometry/topology, and/or the like) of the high cognitive load portion 812, the visibility of the high cognitive load portion as the user approaches the high cognitive load portion, and/or the like.

FIG. 4 provides a block diagram of a familiarization system 500 for generating familiarization information/data to be provided to a user. FIG. 5 provides a block diagram illustrating data flows within an example familiarization system 500 for generating familiarization content to be provided to a user. In an example embodiment, the system comprises a navigation engine 300. In an example embodiment, a navigation engine 300 is configured for determining one or more routes from an origin location to a destination location. For example, a navigation engine 300 may access a geographic database for determining one or more routes for a particular trip. In an example embodiment, the navigation engine 300 may operate on the vehicle apparatus 20, one the network apparatus 10, and/or may be a distributed application that operates in part on the vehicle apparatus 20 and in part on the network apparatus 10, and/or the like. In various embodiments, the navigation engine 300 is configured to provide a user with route information/data as the user traverses the route (e.g., "turn left on A Street"), provide a user with an overview of the route, provide the user with familiarization content (e.g., warnings, notifications, text, graphics, and/or alerts regarding high cognitive load portions), and/or cause a vehicle apparatus to provide a user with navigation information/data, route overview, and/or familiarization content. In various embodiments, the navigation engine 300 is configured to provide route and/or navigation information/data to an extraction engine 100, provide configuration information/data to a configuration engine 400, and/or the like. In an example embodiment, route information/data is navigation information/data that corresponds to a route from an origin location to a destination location. In various embodiments, navigation information/data comprises geographic information/data such as information regarding road segments; intersections between road segments; information/data corresponding to POIs; expected, historical, and/or (near) real-time traffic, weather, and/or driving effort information/data corresponding to road segments, intersections, and/or POIs, and/or the like.

In various embodiments, the familiarization system 500 further comprises a high cognitive load model 200. In various embodiments, the high cognitive load model 200 is configured for determining and/or identifying various high load navigation scenarios and provide scenario information/data and/or scenario templates corresponding to the identified high load navigation scenarios. In an example embodiment, the high cognitive load portions of a route are identified and/or determined based on analyzing route information/data for the route based on and/or using the scenario information/data and/or scenario templates. In various embodiments, the high cognitive load model 200 operates on the network apparatus 10. In an example embodiment, a high cognitive load model 200 may generates one or more instances of scenario information/data and/or scenario templates that comprise templates, threshold requirements, and/or other models that may be used to determine and/or identify high cognitive load portions of a route. In an example embodiment, the familiarization system 500 comprises two or more high cognitive load models 200. For example, a first high cognitive load model 200 may correspond to a first type and/or class of high cognitive load portions (e.g., high cognitive load portions corresponding to EOIs and/or POIs and/or a particular type of EOIs and/or POIs), a second high cognitive load model 200 may correspond to a second type and/or class of high cognitive load portions (e.g., high cognitive load portions corresponding to road geometry and/or topology, difficult driving scenarios, various weather scenarios, and/or the like).

In an example embodiment, the high cognitive load model 200 is a human cognitive navigation model 205 (see FIG. 5). In various embodiments, a cognitive navigation model 205 is a cognitive model configured to model the cognitive load of a user navigating a route. In an example embodiment, the cognitive navigation model 205 is trained using machine learning. For example, machine learning engine 250 may perform machine learning to generate the cognitive navigation model 205, update model parameters of the cognitive navigation model 205, and/or the like. In various embodiments, the machine learning engine 250 may use user behavior information/data stored in a user behavior data store and/or database 260 and/or user feedback (e.g., via a driver questionnaire and/or the like) for training the cognitive navigation model 205.

In various embodiments, the familiarization system 500 further comprises a configuration engine 400. In various embodiments, the configuration engine 400 operates on the network apparatus 10 and/or as a distributed application operating in part on the network apparatus 10 and in part on the vehicle apparatus 20. In various embodiments, the configuration engine 400 is configured to receive configuration information/data, store and/or format the received configuration information/data and provide the configuration information/data to other components of the familiarization system 500 (e.g., the navigation engine 300, high cognitive load model 200, extraction engine 100, and/or the like). For example, one or more users may fill out an operator/driver questionnaire or survey regarding driving situations that may cause the user stress (e.g., increase the user's cognitive load), user preferences and/or feedback regarding what type of familiarization content (e.g., content, how the content is provided, and/or the like) help to reduce the user's cognitive load. The questionnaire or survey results may be provided to the configuration engine 400 as configuration information/data. In various embodiments, parameters for a cognitive navigation model 200 may be provided to the configuration engine 400 as configuration information/data. In various embodiments, navigation parameters may be provided to the configuration engine 400 as configuration information/data. In various embodiments, various other parameters (e.g., vehicle handling parameters, and/or the like) may be provided to the configuration engine 400 as configuration information/data.

In various embodiments, the familiarization system 500 further comprises an extraction engine 100. In various embodiments, the extraction engine 100 operates on the network apparatus 10. In various embodiments, the extraction engine 100 is configured to receive scenario information/data and/or scenario templates and route information/data for the route and identify high cognitive load portions of a route and generate and/or extract familiarization information/data corresponding to the high cognitive load portions of the route based on the route information/data for the route. For example, the extraction engine 100 receives scenario information/data and/or scenario templates from the high cognitive load model 200. In an example embodiment, the high cognitive load model 200 (e.g., the cognitive navigation model 205) provides and the extraction engine 100 receives driving characteristics information/data corresponding to how a individual user and/or a generic user (possibly of a particular class of users) is expected to respond to various driving scenarios, information/data regarding navigation scenarios that tend to lead to an increase cognitive load for a user, behavior aspects information/data regarding a individual user and/or a generic user (possibly of a particular class of user) behavior (e.g., response to various types of familiarization content warnings, text, graphics, notifications, and/or alerts, and/or the like), constraints, and/or other information/data. The extraction engine 100 further receives route information/data comprising POI information/data, EOI information/data, and/or roadway information/data (e.g., map information/data corresponding to the links, nodes, intersections, road geometry, road topology, and/or the like along the route) corresponding to the route from the navigation engine 300. For example, the navigation engine 300 may provide and the extraction engine 100 may receive POI static information/data; POI dynamic information/data; current, historical, and/or predicted weather information/data; driving effort information/data; traffic information/data; and/or other information/data corresponding to the route. In an example embodiment, the route information/data comprises the map information/data required to describe the route. In an example embodiment, the extraction engine 100 may receive configuration information/data from the configuration engine 400. In various embodiments, the extraction engine 100 may receive various other information/data such as, for example, time information/data. For example a clock of the vehicle apparatus 20 and/or network apparatus 10 and/or user input may provide a time corresponding to a particular trip (e.g., departure time, arrival time, a time corresponding to when a user expects and/or desires to be located at a particular point along the route, and/or the like). This time may be used to identify relevant dynamic EOI and/or POI information/data for the route of a particular trip.

The extraction engine 100 generates and/or extracts familiarization information/data from the route information/data for the high cognitive load portions of the route. In an example embodiment, familiarization information/data comprises (a) a location of a high cognitive load portion (e.g., identifying the location at which a user will enter a high cognitive load portion along the route, designating a section of the route as a high cognitive load portion, and/or the like), (b) a trigger point (e.g., a particular location along the route at which the warning and/or alert should be provided to the user and/or a particular amount of time before the user is expected to reach the high cognitive load portion at which the warning and/or alert should be provided to the user), (c) the familiarization content to be provided to the user via the user interface 28 (e.g., text to be audibly provided to a user, text and/or graphics to be visually provided to the user, and/or the like), and/or the like. In an example embodiment, the familiarization information/data further comprises one or more settings modifications. In an example embodiment, the extraction engine 100 is configured to provide the familiarization information/data 150 such that the familiarization content may be provided to the user. In an example embodiment, extraction engine 100 provides the familiarization information/data to an application operating on the vehicle apparatus 20. In an example embodiment, the extraction engine 100 provides one or more settings modifications to the navigation engine 300 based on the extracted and/or generated familiarization information/data and/or route information/data corresponding to the high cognitive load portions of the route. In an example embodiment, the navigation engine 300 updates the settings used to provide information/data to a user (e.g., via the user interface 28) based on the settings modifications. In an example embodiment, the navigation engine 300 may be configured to manage, update, modify, and/or the like one or more operating parameters of the vehicle 5 (e.g., braking responsiveness, handling responsiveness, daytime running lights and/or headlight operation, driving mode, and/or the like) based on the settings modifications.

In various embodiments, an extraction engine 100 comprises an EOI creation engine 110, a content generation engine 120, an identification engine 130, and/or the like. For example, the EOI creation engine may be configured for generating and/or creating one or more EOIs based on POI information/data for one or more POIs. EOI creation is described elsewhere herein in detail.

In various embodiments, the identification engine 130 uses scenario information/data and/or scenario templates provided by one or more high cognitive load models 200 (e.g., a cognitive navigation model 205) to analyze the route information/data (including EOI information/data corresponding to EOIs located along the route) for the route to determine and/or identify high cognitive load portions of the route. For example, in an example embodiment, the scenario information/data and/or scenario templates may provide templates and/or threshold requirements for various high load navigation scenarios (e.g., navigation scenarios that may increase cognitive load for a user navigating the navigation scenario). In an example embodiment, the identification engine 130 is configured to review, analyze, and/or the like EOI information/data, POI information/data, roadway information/data (e.g., geometry and/or topology information/data of one or more roads corresponding to a route to determine and/or identify high cognitive load portions of the route. In an example embodiment, an identification engine 130 may determine if a property of a road segment, link, and/or the like (e.g., based on the road geometry and/or topology information/data) satisfies one or more threshold requirements of an instance of scenario information/data and/or scenario template. For example, in an example embodiment, if the curvature of a section of a road segment satisfies a first curvature threshold requirement, the section of the road segment is identified as a high cognitive load portion; if there is a driveway or road and/or intersection that is located at a point along a section of a road segment that has a curvature that satisfies a second curvature threshold requirement, the section of the road segment is identified as a high cognitive load portion; if a section of a road segment has a grade or slope that satisfies a first grade threshold requirement, the section of the road segment is identified as a high cognitive load portion; if a section of the road segment has a grade or slope that satisfies a second grade threshold requirement and a curvature that satisfies a third curvature threshold requirement, the section of the road segment is identified as a high cognitive load portion; and/or the like. In various embodiments, the identification engine 130 may compare one or more templates to the route information/data to determine if a template fits any portion of the route information/data and/or if any portion of the route information/data satisfies a threshold requirement to determine and/or identify high cognitive load portions of the route.

In various embodiments, the content generation engine 120 is configured to create and/or generate familiarization information/data for the determined and/or identified high cognitive load portions of the route. For example, the content generation engine 120 may generate the familiarization content, determine and/or identify the trigger point at which the familiarization content should be provided to the user, determine and/or generate setting modifications, and/or the like.

FIG. 6 provides a flowchart of example processes, operations, procedures, and/or the like of a network apparatus 10 for providing a user with familiarization content, according to an example embodiment. Starting at block 502, new route information/data is received. For example, the network apparatus 10 receives new route information/data. For example, the network apparatus 10 comprises means, such as processor 12, memory 14, communications interface 16, and/or the like for receiving new route information/data. In an example embodiment, the new route information/data comprises complete route information/data for a route of a particular trip. In an example embodiment, the new route information/data comprises information/data defining a particular trip (e.g., an origin location, a destination location, and a time) and the navigation engine 300 generates the route information/data for the route based on the new route information/data.

In an example embodiment, the new route information/data is provided (e.g., transmitted) by the vehicle apparatus 20. For example, in an example embodiment, a vehicle apparatus 20 may operate a navigation application configured to provide a user with an IUI via the user interface 28 of the vehicle apparatus 20. The IUI may be configured to receive (e.g., via user interaction with the user interface 28 and/or the like) information/data defining a particular trip.

For example, a user may provide input identifying a destination location, an origin location, and a time. In an example embodiment, the user may provide input via the user interface 28 identifying a destination location and the navigation application may assume that the origin location is the current location of the user (e.g., as determined by the location sensor 29 of the vehicle apparatus 20) and the time is depart at the current time unless the user provides input (e.g., via the user interface 28) indicating a different origin location and/or time. In an example embodiment, a user may provide input comprising a destination address (e.g., a street address), a destination geolocation (e.g., longitude and latitude), a name of a POI located at the destination location, selecting a position on a map, and/or the like to provide input indicating the destination location. Similarly, a user may provide input comprising an origin address, an origin geolocation (e.g., longitude and latitude), a name of a POI located at the origin location, selecting a position on a map, and/or the like to provide input indicating the origin location. Upon receipt of the new route information/data (e.g., via the user interface 28), the vehicle apparatus 20 may provide the new route information/data to the network apparatus 10. In an example embodiment, the vehicle apparatus 20 may determine a route based on the new route information/data and include route information/data corresponding to the determined route as part of the new route information/data. In an example embodiment, the vehicle apparatus 20 may provide the new route information/data to the network apparatus 10 such that the network apparatus 10 may determine a route based on the new route information/data.

After the receiving the new route information/data, the network apparatus 10 may determine a route based on the new route information/data, if the new route information/data does not indicate a route. For example, the navigation engine 300 may determine a route based on the new route information/data. Then, at block 504, it may be determined if the route is an unfamiliar and/or novel route for the user. For example, the network apparatus 10 (e.g., the extraction engine 100 operating on the network apparatus 10) may determine if the route is an unfamiliar and/or novel route for the user. For example, the network apparatus 10 may comprise means, such as the processor 12, memory 14, and/or the like, for determining if the route is an unfamiliar and/or novel route for the user. In various embodiments, an unfamiliar and/or novel route is a route that, according to a user profile corresponding to the user, at least a portion of the route has not been previously traversed by the user; when a new scenario (e.g., construction, different time of day, a different day of the week than when the user usually traverses and/or has previously traversed the route, different weather conditions than when the user has previously traversed the route, and/or the like); a route that the user has traversed only a few times (e.g., a number of times that satisfies a novelty threshold requirement); and/or route that, based on user preferences stored in association with a user profile corresponding to the user indicate that the route should be considered unfamiliar and/or novel. In an example embodiment, if it is determined that the route is not unfamiliar and/or novel for the user, the process may end (e.g., familiarization information/data may not be determined and provided to the user). In an example embodiment, if it is determined that the route is unfamiliar and/or novel for the user the process continues to block 506.

At block 506, the extraction engine 100 operating on the network apparatus 10 receives information/data from the navigation engine 300 (which may also be operating on the network apparatus 10). For example, the network apparatus 10 may comprise means, such as processor 12, memory 14, and/or the like, for passing information/data from the navigation engine 300 to the extraction engine 100. For example, the navigation engine 300 may pass route information/data (including POI and/or EOI information/data for the route such as static and/or dynamic elements of the POI information/data), weather information/data, driving effort information/data, traffic information/data, and/or other information/data corresponding to the route such that the information/data is received by the extraction engine 100.

At block 508, one or more EOIs may be generated. For example, based on the POI information/data for the route the EOI creation engine 110 (operating on the network apparatus 10) may generate one or more EOIs corresponding to the route. For example, the EOI creation engine 110 operating on the network apparatus 10 may generate one or more EOIs corresponding to the route. In an example embodiment, the network apparatus 10 comprises means, such as the processor 12, memory 14, and/or the like, for generating one or more EOIs corresponding to the route. In an example embodiment, the EOI creation engine 110 may generate, maintain, and/or the like an EOI data store (e.g., an EOI database) comprising EOI information/data for previously generated EOIs. The EOI creation engine 110 may update the EOI data store with any EOI information/data for the one or more generated EOIs corresponding to the route. The EOI creation engine 110 may, prior to generating the one or more EOIs, determine if there are any EOIs corresponding to the route stored in the EOI data store and access the corresponding EOI information/data from the EOI data store. For example, the EOI creation engine 110 may minimize the number of EOIs that need to be created for a route by accessing previously generated EOIs stored in the EOI data store.

At block 510, the extraction engine 100 receives information/data from the high cognitive load model 200. For example, the extraction engine 100 (operating on the network apparatus 10) may pass a request for information/data to the high cognitive load model 200 (operating on the network apparatus 10) and, responsive thereto, receive scenario information/data and/or scenario templates from the high cognitive load model 200. For example, the network apparatus 10 may comprise means, such as processor 12, memory 14, and/or the like, for passing information/data from the high cognitive load model 200 to the extraction engine 100. For example, the extraction engine 100 may receive driving characteristics information/data corresponding to how a individual user and/or a generic user (possibly of a particular class of users) responds to various driving scenarios, information/data regarding navigation scenarios that tend to lead to an increase cognitive load for a user, behavior aspects information/data regarding a individual user and/or a generic user (possibly of a particular classification of user) behavior (e.g., response to various types of familiarization content warnings, notifications, text, graphics, and/or alerts, and/or the like), constraints, and/or other information/data from the high cognitive load model 200. For example, in an example embodiment, the high cognitive load model 200 (and/or a plurality of high cognitive load models 200) may provide templates and/or threshold requirements for various scenarios that may increase cognitive load for a user. In an example embodiment, the information/data provided by the high cognitive load model 200 to the extraction engine 100 may be user specific. For example, the high cognitive load model 200 may be personalized based on user behavior information/data stored in the user behavior database 260, a user profile, and/or the like. In an example embodiment, a user may be associated with a class of users (e.g., new operators/drivers, elderly operators/drivers, aggressive operators/drivers, timid operators/drivers, and/or the like) and the high cognitive load model 200 may be personalized for a class of users. In an example embodiment, a class of users is a group of users that have at least one attribute in common. For example, a classes of users may be generated by grouping users by at least one of age, years driving, driving experience, driving behavior, user preferences, and/or the like. Thus, in various embodiments, the information/data provided by the high cognitive load model 200 to the extraction engine 100 may be personalized for the user and/or a class associated with the user.

At block 512, the high cognitive load portions are determined and/or identified. For example, the identification engine 130 (operating on the network apparatus 10) may identify and/or determine the high cognitive load portions for the route based on the information/data received from the high cognitive load model 200 and the navigation information/data received from the navigation engine 300. In an example embodiment, the navigation information/data received form the navigation engine 300 comprises route information/data such as POI information/data, EOI information/data, and/or roadway information/data (e.g., from link and/or node data records) corresponding to the route. For example, the network apparatus 10 may comprise means, such as the processor 12, memory 14, and/or the like, for determining and/or identifying high cognitive load portions of a route. As noted above, the extraction engine 100 may further receive additional information/data (e.g., time, configuration information/data, and/or the like) and the determination and/or identification of the high cognitive load portions may be further based on the additional information/data. In various embodiments, the identification engine 130 may compare one or more templates and/or threshold requirements provided by the high cognitive load model 200 to the route information/data provided by the navigation engine 300 to determine if a template fits any portion of the route information/data and/or if any portion of the route information/data satisfies a threshold requirement to determine and/or identify high cognitive load portions of the route. For example, the identification engine 130 may be configured and/or programmed to determine portions of the route that are likely to increase the cognitive load of a user navigating the route based on the information/data provided by the high cognitive load model 200 and the route information/data provided by the navigation engine 300.

At block 514, familiarization information/data is extracted and/or generated. For example, the content generating engine 120 (operating on the network apparatus 10) may extract and/or generated familiarization information/data based on the configuration information/data (e.g., user preferences for the user as stored in association with a user profile corresponding to the user) and the route information/data corresponding to the identified and/or determined high cognitive load portions for the route. For example, the network apparatus 10 may comprise means, such as processor 12, memory 14, and/or the like, for extracting and/or generating familiarization information/data. For example, the identification engine 130 may pass information/data identifying the high cognitive load portions for the route to the content generating engine 120. The content generating engine 120 may then use configuration information/data, such as user preferences for the user, to generate and/or extract familiarization information/data from the route information/data for the route corresponding to the high cognitive load portions of the route. For example, the content generation engine 120 may generate the familiarization content, determine and/or identify the trigger point at which the familiarization content should be provided to the user, determine and/or generate setting modifications, and/or the like based on the configuration information/data and the route information/data.

In an example embodiment, the content extraction engine 120 may further generate and/or extract one or more settings modifications, at block 516. For example, the one or more settings modifications may be configured for updating one or more settings of the navigation engine 300 (e.g., a portion of the navigation engine 300 such as a navigation application operating on the vehicle apparatus 20 and providing the IUI to the user via the user interface 28). For example, the content extraction engine 120 (operating on the network apparatus 10) may determine, generate, and/or extract one or more settings modifications based on the configuration information/data, route information/data, and/or the like. For example, the settings modifications may be configured to update settings of a navigation application operating on the vehicle apparatus 20 (e.g., to provide the IUI to the user via the user interface 28) to provide the user with information regarding an upcoming maneuver more times and/or earlier in the route than if the user was familiar with the route. In various embodiments, the settings modifications may cause one or more modifications of the operating parameters of the vehicle 5. In an example embodiment, the vehicle apparatus 20 may be configured to manage, update, modify, and/or the like one or more operating parameters of the vehicle 5 (e.g., braking responsiveness, handling responsiveness, daytime running lights and/or headlight operation, driving mode, and/or the like) based on the settings modifications. In an example embodiments, the settings modifications are included in an instance of familiarization information/data and/or alongside the familiarization information/data.

At block 518, the route information/data and the familiarization information/data is provided to the vehicle apparatus 20. In an example embodiment, one or more settings modifications may be provided to the vehicle apparatus 20 alongside and/or as part of the route information/data and/or the familiarization information/data. For example, the network apparatus 10 may transmit and/or provide the route information/data and the familiarization information/data (and possibly settings modifications). For example, the network apparatus 10 may comprise means, such as processor 12, memory 14, communications interface 16, and/or the like, for transmitting and/or providing the route information/data and the familiarization information/data (and possibly settings modifications). In an example embodiment in which the new route information/data include route information/data for a route, the network apparatus 10 may only provide the familiarization information/data (possibly including and/or accompanied by settings modifications). For example, the vehicle apparatus 20 may receive the familiarization information/data (possibly including and/or accompanied by settings modifications) and may also receive route information/data. For example, the vehicle apparatus 20 may comprise means, such as the processor 22, memory 24, communications interface 26, and/or the like, for receiving the familiarization information/data (possibly including and/or accompanied by settings modifications) and may also receive route information/data.

In an example embodiment, upon receipt of settings modifications, the vehicle apparatus 20 may enact the settings modifications (e.g., changing and/or updating one or more settings of the vehicle apparatus 20, operating parameters of the vehicle 5, and/or the like). In an example embodiment, one or more settings modifications correspond to high cognitive load portions of the route and those settings modifications may be implemented at the trigger point (and/or a separate settings trigger point) corresponding to the corresponding high cognitive load portions and indicated by the corresponding instance of familiarization information/data.

The user may then navigate the route in accordance with the route information/data. For example, the IUI presented to the user via the user interface 28 may provide the user with a map showing the route, turn-by-turn instructions for navigating the route, and/or the like. The user may then navigate the route based on the route information/data provided via the IUI. The vehicle apparatus 20 may cause the location sensor 29 to track the location of the user as the user navigates the route. When the user arrives at a trigger point indicated by an instance of familiarization information/data, the familiarization content of the instance of familiarization information/data is provided to the user via the IUI provided via the user interface 28. For example, in an example embodiment, when a vehicle apparatus 20 determines that the user is located at a position (e.g., a street address, a geolocation such as latitude and longitude, a particular intersection and/or road segment, and/or the like) along the route and/or has passed through a position along the route indicated by the trigger point of an instance of familiarization information/data, the processor 22 and the navigation application causes the user interface 28 to provide the familiarization content to the user. For example, in an example embodiment, when the vehicle apparatus 20 estimates that the user will reach a high cognitive load portion in a particular amount of time (as indicated by the corresponding trigger point), the processor 22 and the navigation application causes the user interface 28 to provide the familiarization content to the user.

As should be understood, various embodiments relate to aiding a human operator/driver of a vehicle reduce his or her cognitive load while traversing an unfamiliar and/or novel route. However, some embodiments may be adapted to provide familiarization information/data to a vehicle control system of an autonomous driving system and/or ADAS. In an example of one such embodiment, a cognitive model configured to determine and/or identify portions of a route at which an autonomous driving system and/or ADAS may be "overwhelmed" or overloaded in processing sensor data collected as the vehicle 5 traverses the route (e.g., urban canyons in which localization cannot depend on GNSS data, areas having a large number of features and/or a large amount of non-static objects within a camera field of view, areas having large numbers of pedestrians, and/or the like) is used to identify the high cognitive load portions. Thus, while the present invention is generally described herein as corresponding to providing familiarization content to a human user (e.g., a human operator/driver of a vehicle 5), various embodiments provide familiarization information/data to an autonomous driving system and/or ADAS.

Generating EOIs

In various embodiments, POIs are described by a POI model. In various embodiments, a POI model comprises POI information/data formatted in accordance with a defined data model. In an example embodiment, a POI may be associated with a type and the corresponding POI model may correspond to a defined data model of the corresponding type. For example, a first data model may be defined for use with POIs that are restaurants and a second, different data model may be defined for use with POIs that are public parks. Some non-limiting types of POIs may include restaurants, storefronts, businesses, public services offices, shipping/receiving locations, gas stations, public parks, cross walks, traffic signals, bus and/or other public transportation stops/stations, and/or the like, in an example embodiment. In various embodiments, the POI model may be formatted such that familiarization content corresponding to the POI may be readily determined, generated, and/or extracted therefrom.

In various embodiments, the data model comprises one or more static elements for static information/data corresponding to the POI, wherein static information/data is generally not time dependent. For example, the static information/data for a POI may comprise a street address of the POI; a geolocation of the POI; a description of the POI; one or more consumer reviews corresponding to the POI; size, color, and/or other appearance aspects of the POI; and/or other information/data regarding the POI that is generally not time dependent. The data model may further comprise one or more dynamic elements for dynamic information/data corresponding to the POI. Dynamic information/data that is generally time dependent. For example, the dynamic information/data for a POI may comprise an indication of whether a business, school, public building/park, and/or the like corresponding to the POI is open or closed; if a bus is arriving and/or located at a bus stop corresponding to a POI; if the POI is expected to be experience/causing a high pedestrian and/or vehicle traffic situation (e.g., a stadium is hosting a professional sports game, concert, conference, and/or the like and is higher levels of pedestrian and/or vehicle traffic are expected in the vicinity of the stadium); a cross walk signal has been activated; and/or other time dependent information/data. For example, the dynamic information/data may change based on time of day, day of the week, month, calendar day, live (e.g., real-time or near real-time) traffic information/data, and/or the like. In various embodiments, static and/or dynamic information/data corresponding to a POI along a route may be used to determine and/or identify high cognitive load portions of the route and/or to determine, generate, and/or extract familiarization content corresponding to the high cognitive load portions along the route.

In various embodiments, it may be determined that two or more POIs may be linked such that the link between the two or more POIs affects the experience of navigating a route in the vicinity of the linked POIs. For example, two or more POIs may be linked to generate an EOI. In various embodiments, an EOI is described by EOI an EOI model. In various embodiments, an EOI model comprises EOI information/data formatted in accordance with a defined EOI data model. In an example embodiment, an EOI may be associated with a type and the corresponding EOI model may correspond to a defined data model of the corresponding type. For example, a first data model may be defined for use with EOIs that correspond to increased pedestrian traffic and a second, different data model may be defined for use with EOIs that correspond to difficult road topologies. In an example embodiment, the POIs linked to generate an EOI may be located near one another. For example, the POIs may be located within a predefined distance of at least one other POI of the EOI. In an example embodiment, the predefined distance may be based on a type of the EOI. For example, a type EOI corresponding to increased pedestrian traffic may have a smaller predefined distance than a type of EOI corresponding to increased vehicle traffic, road topology, and/or the like. In various embodiments, the EOI model may be formatted such that familiarization content corresponding to the EOI may be readily determined, generated, and/or extracted therefrom.

In various embodiments, an EOI data model may comprise static and dynamic elements. For example, EOI information/data comprises generally time independent static information/data and time dependent dynamic information/data. For example, the dynamic information/data may change based on time of day, day of the week, month, calendar day, live (e.g., real-time or near real-time) traffic information/data, and/or the like. In various embodiments, EOI information/data is generated and/or determined based on the POI information/data corresponding to the two or more POIs linked to generate the EOI. In various embodiments, static and/or dynamic information/data corresponding to an EOI along a route may be used to determine and/or identify high cognitive load portions of the route and/or to determine, generate, and/or extract familiarization content corresponding to the high cognitive load portions along the route.

In an example embodiment, an EOI model may comprise a list of POI identifiers identifying the two or more linked POIs (and/or the corresponding POI models) corresponding to the EOI, an indication of the relationship between the two or more POIs corresponding to the EOI, time information/data that, in various circumstances, should be considered for the two or more POIs corresponding to the EOI, and/or other information/data corresponding to the EOI. For example, an EOI model may be represented by the array {POIM1, ..., POIMn, POIR, T, O}, wherein POIM1, ..., POIMn, are POI identifiers identifying the two or more POI models corresponding to the POIs linked to generate the EOI, POIR describes the relationship between the linked POIs, T is the time information/data, and O is other information/data corresponding to the EOI.

For example, an EOI may be generated that comprises the following POIs: an ice cream shop, a school, and a cross walk signal. In this example, the relationship between the linked POIs may be ice cream shop within x meter radius of school with routing between school and ice cream shop including a cross walk corresponding to the cross walk signal. In an example embodiment, the status of the cross walk signal may be taken into account. In an example embodiment, the status of the cross walk signal may not be taken into account because a significant number of the pedestrians expected to cross the cross walk are children. The time information/data may comprise the hours that the ice cream shop is open, the lunch break time at the school, the evening/afternoon closing time for the school, and/or the like. The other information/data may comprise other information/data to be considered as necessary/relevant such as, for example, reduced visibility due to fog or other weather conditions, the present speed of the vehicle (e.g., may indicate to the vehicle apparatus 20 how assertively and/or the timing when the user should be provided with the corresponding familiarization information/data), and/or the like.

Another example EOI may be defined by the set of POI models comprising a stadium, the available/open parking lots and/or parking decks within a first predefined distance of the stadium, bus stops and/or other public transit stops and/or stations within a second predefined distance of the stadium, and any routing POIs (e.g., cross walks, cross walk signals, and/or the like) between the parking lots, parking decks, and/or bus stops and/or other public transit stops and/or stations and the stadium.

FIG. 7 provides a block diagram of an EOI generation system 600 for generating, determining, identifying, and/or the like EOIs. In an example embodiment, the EOI generation system 600 comprises and/or receives information/data from navigation engine 300. For example, the navigation engine 300 may provide static POI information/data, dynamic POI information/data, weather information/data, driving effort information/data, and/or other information/data to the EOI model creation engine 610 and/or the EOI creation engine 110. In an example embodiment, if EOIs are being generated, extracted, and/or identified for a particular route, the navigation engine 300 may provide route information/data for the route. In an example embodiment, the EOI generation system 600 further comprises a navigation data interface 630 configured to allow the EOI generation system 600 to interface with various sources of geographic information/data (e.g., a geographic database, digital map, and/or the like).

In various embodiments, the EOI generation system 600 includes an external data extraction model 620. For example the external data extraction model 620 may be the high cognitive load model 200 (e.g., a cognitive navigation model 205), a fuel saving model, and/or other data extraction model. The external data extraction model 620 may be generated externally to the EOI generation system 600 and then used to inform the creation of EOI models. In an example embodiment, the external data extraction model 620 may comprise EOI data models that may be used for generating EOI models and EOI generation system 600 may not include the EOI model generation engine 610. In various embodiments, the external data extraction model 620 provides data extraction information/data to the EOI model generation engine 610 and/or EOI generation engine 110. For example, the external data extraction model 620 may indicate elements to include in the EOI data model such that EOI models generated based on the EOI data model will be configured to provide efficient and effective information/data for a desired purpose. For example, if the external data model 620 is a cognitive navigation model 205, the EOI data models may be configured to generate EOI models that provide efficient and effective information/data for route determination and/or familiarization information/data extraction, determination, and/or generation.

In an example embodiment, the EOI model generation engine 610 is configured to receive data extraction information/data provided by the external data extraction model 620 and use the data extraction information/data to generate EOI models from the information/data provide by the navigation engine 300 and/or other geographic information/data. For example, in an example embodiment, the EOI model generation engine 610, with the use of machine learning engine 650, learns to identify clusters of POIs that may be linked to form an EOI. For example, an EOI model generation engine 61 may be trained using machine learning as supported by the machine learning engine 650. In an example embodiment, the EOI model generation engine 610 is configured to define one or more EOI data models that may be used for generating and/or describing EOIs based on information/data provided by the navigation engine 300 and/or other geographic information/data. For example, the EOI model generation engine 610 may define one or more data models corresponding to different types of EOIs and/or different scenarios that may cause POIs to be linked and/or have a relationship with one another. For example, one example EOI model may be configured to provide a data model for EOIs comprising (a) a first POI that is a school and/or other POI that children are known to frequent, (b) an attraction of interest to children (e.g., ice cream shop, candy store, soccer field, and/or the like) within a predefined radius of the first POI (e.g., a tenth of a mile, a quarter of a mile, half a mile, half a kilometer, one kilometer, one and a half kilometers, and/or the like), and (c) any cross walks, cross walk signals, and/or other routing POIs located along expected walking routes between the first POI and the second POI. In an example embodiment, the EOI model generation engine 610 generates one or more EOI models to be used as templates for identifying and/or determining EOIs from information/data provided by the navigation engine 300 and/or other geographic information/data. In an example embodiment, one or more dynamic elements of the data model may allow for the consideration of outdoor temperature and/or other weather information/data (e.g., few children are likely to be walking to the soccer field after school if it is raining outside or extremely cold/hot), time of day (e.g., it is unexpected that children will be walking from the school to an ice cream shop at 9 am), day of the week and/or calendar day (e.g., for determining if the school and/or other POIs are open or closed that day), and/or the like.

The EOI model generation engine 610 may be configured to provide the one or more defined EOI data models to the EOI generation engine 110. In various embodiments, the EOI model generation engine 610 may further provide the EOI generation engine 110 within information/data such as driving characteristics (e.g., example characteristics of operators/drivers that should be warned, alerted, and/or notified regarding the EOI), behavioral aspects (e.g., information/data regarding various POIs that may be linked due to human behavior such as the linking of a school to an ice cream shop or a parking lot to a nearby stadium), constraints (e.g., the predefined distances between POIs that are available for linking into various types of EOIs), and/or other information/data. The EOI generation engine 110 may then use the EOI data models and other information/data provided by the EOI model generation engine 610 to identify, determine, and/or generate EOIs based on the information/data provided by the navigation engine 300 and/or other geographic information/data. For example, the EOI generating engine 110 may be determine if there are any clusters of POIs along the route that satisfy one or more conditions, match an EOI template, fit an EOI data model, and/or the like. If a cluster of POIs along the route (and/or in a geographic area being considered) are determined to satisfy one or more conditions, match an EOI template, fit an EOI data model, and/or the like, the cluster of POIs may be linked to generate an EOI and a corresponding EOI model may be generated using an appropriate EOI data model and the POI models corresponding to the linked POIs.

In an example embodiment, an EOI model generation engine 610 is configured to receive human behavior information/data from, from example, user behavior database 260. For example, the human behavior information/data may be used to determine and/or define one or more human behavior and/or interest criteria. In an example embodiment, the human behavior information/data may be used as an input for training an EOI model generation engine 610 using machine learning engine 650.

FIG. 8 provides a flowchart illustrating various processes and procedures that may be performed to generate an EOI, according to an example embodiment. Starting at block 702, the extraction engine 100 receives data extraction information/data from external data extraction model 620. For example, the EOI model generation engine 610 (operating on the network apparatus 10) may receive data extraction information/data. For example, the network apparatus 10 may comprise means, such as processor 12, memory 14, communications interface 16, and/or the like, for receiving and/or accessing data extraction information/data. In various embodiments, the data extraction model may define, identify, indicate, and/or the like at least a portion of the information/data that should be included in an EOI model. For example, the data extraction information/data may define, identify, indicate, and/or the like one or more fields, elements, and/or the like of at least one EOI data model. In an example embodiment, the external data extraction model 620 is a high cognitive load model 200 and/or a cognitive navigation model 205 and the data extraction information/data may indicate one or more data fields and/or elements to be included in at least one EOI data model such that the resulting EOI models may be used to efficiently and effectively identify high cognitive load portions of a route based on the EOI model and/or efficiently and effectively generate, extract, and/or determine familiarization content for a corresponding high cognitive load portion based on the EOI model.

At block 704, navigation information/data is received from the navigation engine 300. In an example embodiment, route information/data is received from the navigation engine 300. In an example embodiment, route information/data is navigation information/data corresponding to a route from an origin location to a destination location. For example, the EOI model generation engine 610 (operating on the network apparatus 10) may receive navigation information/data (e.g., provided by the navigation engine 300). In an example embodiment, the navigation information/data comprises static elements of POI information/data; dynamic elements of POI information/data; expected, historical, current, and/or (near) real-time weather information/data; information/data regarding road segments and/or intersections linking road segments (e.g., link and/or node data records); and/or other geographic information/data and/or information/data corresponding to at least a portion of a road network. For example, the network apparatus 10 may comprise means, such as processor 12, memory 14, communications interface 16, and/or the like, for receiving and/or accessing navigation information/data.

At block 706, the EOI generation engine 610 (operating on the network apparatus 10) generates, defines, determines, and/or the like one or more EOI data models. For example, the network apparatus 10 may comprise means, such as processor 12, memory 14, and/or the like, for generating, defining, determining, and/or the like one or more EOI data models. In various embodiments, the EOI data models are generated, defined, determined, and/or the like based on the navigation information/data and the data extraction information/data. In various embodiments, the EOI data models may be generated, defined, determined, and/or the like using machine learning. For example, the EOI model generation engine 610, via the machine learning engine 650, may learn patterns that may be used to identify clusters and/or groups of POIs that may be linked (e.g., via static and/or dynamic elements of the POIs) to generate an EOI. In various embodiments, a cluster and/or group of POIs that may be linked to generate an EOI are related to one another in way that is likely to affect the driving experience (e.g., the experienced cognitive load) of a user navigating a route past at least one POI of the EOI. For example, the cluster and/or group of POIs may be linked in a manner that is expected to cause increased pedestrian and/or vehicle traffic between two or more POIs, increase the driving effort required to effectively and/or efficiently navigate past at least a portion of the EOI, and/or the like. For example, a first POI of a first EOI may be a school, a second POI of the first EOI may be an ice cream shop within a predefined distance of the school, and a third POI of the first EOI may be a cross walk between the school and the ice cream shop. In another example, a first POI of a second EOI is a stadium, a second POI of the second EOI is a public parking lot within a predefined distance of stadium, and a third POI of the second EOI is a cross walk signal along a route between the public parking lot and the stadium.

In various embodiments, the EOI model generation engine 610 generates and/or defines EOI data models. For example, an EOI data model may be a template data record that may be populated with EOI information/data to describe an EOI. In various embodiments, an EOI data model comprises static elements and dynamic elements. In an example embodiment, the EOI data model may define and/or indicate one or more relationship conditions that a cluster and/or group of POIs must satisfy to be linked as an EOI corresponding to the EOI data model. In an example embodiment, the relationship conditions comprise one or more predefined distance criteria. For example, the EOI data model may indicate that each POI of the cluster and/or group of POIs that defines the EOI should be within a predefined distance of all of the other and/or at least one other POI of the cluster and/or group of POIs. The EOI data model may indicate and/or define the predefined distance. In an example embodiment, the one or more relationship conditions may comprise one or more human behavior and/or interest criteria. For example, the human behavior and/or interest criteria may indicate types of POIs that may be related through human behavior and/or interest. In an example embodiment, a human behavior and/or interest criteria may correspond to a road geometry and/or topology that may give rise to increased cognitive load when a user navigates a route along, by, and/or in the vicinity of the cluster and/or group of EOIs. Inn an example embodiment, a human behavior and/or interest criteria may correspond to one or more reasons that may increase human and/or vehicle traffic between two or more POIs.

In an example embodiment, an EOI data model may correspond to a particular type of EOI. For example, a first EOI data model may be defined for use with EOIs that correspond to increased pedestrian traffic and a second, different EOI data model may be defined for use with EOIs that correspond to difficult road topologies. For example, an EOI data model may define a predefined distance corresponding to the corresponding type of EOIs. In an example embodiment, the POIs of an EOI are located within the predefined distance from one another. In an example embodiment, each POI of an EOI is located within the predefined distance from at least one other POI of the EOI. Thus, in various embodiments, the POI linked to generate an EOI are geographically linked (e.g., by being located within the predefined distance of one another) in addition to being related via human behavior and/or interest.

At block 708, the EOI generation engine 110 (operating on the network apparatus 10) may generate, identify, and/or determine one or more EOIs. For example, the network apparatus 10 may comprise means, such as the processor 12, memory 14, and/or the like, for generating, identifying, and/or determining one or more EOIs. In an example embodiment, the one or more EOIs are generated, identified, and/or determined using the one or more EOI data models and/or template EOI data records generated by the EOI model generation engine 610.

In an example embodiment, the one or more EOIs are generated, identified, and/or determines based on navigation information/data (e.g., route information/data). For example, an EOI generation engine 110 may analyze navigation information/data using and/or based on the EOI data models, template EOI data records, and/or the like to identify and/or determine clusters and/or groups of POIs that meet the relationship conditions of an EOI data model and/or template EOI data record. When a cluster and/or group of POIs that meet the relationship conditions of an EOI data model, the EOI generation engine 110 may generate an EOI model (e.g., populate and EOI data model and/or template EOI data record) with EOI information/data generated, determined, and/or extracted from the POI models corresponding to the POIs of the cluster and/or group of POIs corresponding to the EOI. In various embodiments, the relationship conditions of an EOI data model and/or template EOI data record comprise the human behavior and/or interest relationship criteria and the predefined distance criteria corresponding to the EOI data model and/or template EOI data record. For example, the EOI generation engine 110 may analyze navigation information/data (e.g., route information/data) to identify clusters and/or groups of POIs that satisfy the relationship conditions of one or more EOI models, and, for clusters and/or groups of POIs identified as satisfying the relationship conditions, generate corresponding EOI models describing the identified and/or generated EOI comprising the cluster and/or group of POIs.

In an example embodiment, a plurality of EOI generation engines 110 may be used. For example, each EOI generation engine 110 may be configured to identify EOIs corresponding to a particular EOI data model and/or template EOI data record. In another example, each EOI generation engine 110 may be configured to identify EOIs of a particular type.

At block 710, the identified, generated, and/or determined EOIs may be provided. For example, the EOI generation engine 110 (operating on the network apparatus 10) may provide EOI models (and/or portions thereof) describing the identified, generated, and/or determined EOIs. For example, the EOI models (and/or portions thereof) may be received by the identification engine 130 (operating on the network apparatus 10) for use in identifying and/or determining high cognitive load portions of a route and/or by the content generating engine 120 (operating on the network apparatus 10) for use in generating, extracting, and/or determining familiarization information/data (e.g., familiarization content) for one or more high cognitive load portions of a route. For example, the network apparatus 10 may comprise means, such as processor 12, memory 14, communications interface 16, and/or the like for providing and/or receiving the one or more EOI models and/or portions thereof.

At block 712, the identified, generated, and/or determined EOIs may be stored, for example, in an EOI data store (e.g., an EOI database). For example, the network apparatus may cause EOI models describing the identified, generated, and/or determined EOIs to be stored in an EOI data store. For example, the network apparatus 10 may comprise means, such as processor 12, memory 14, communications interface 16 and/or the like, for storing EOI models describing the identified, generated, and/or determined EOIs in an EOI data store. For example, the identification engine 130 (operating on the network apparatus 10) and/or the content generating engine 120 (operating on the network apparatus 10) may access EOI models and/or portions thereof stored in the EOI data store for use in identifying and/or determining high cognitive load portions of a route and/or generating, extracting, and/or determining familiarization information/data (e.g., familiarization content) for one or more high cognitive load portions of a route. In various embodiments, the EOI models corresponding to the identified, generated, and/or determined EOIs are stored for use in performing one or more navigation functions (e.g., localization, route determination, lane level route determination, lane maintenance, route guidance, lane level route guidance, provision of traffic information/data, provision of lane level traffic information/data, provision of route familiarization content, and/or the like).

In an example embodiment, the data extraction information/data received from the external data extraction model 620 may comprise one or more EOI data models, template EOI data records, and/or the like. In such an embodiment, the extraction engine 100 may receive the data extraction information/data as described with relation to block 702, receive the navigation information/data as described with relation to block 704, and then move to identifying, generating, and/or determining EOIs as described with relation to block 708. For example, in some embodiments, the data extraction information/data may comprise one or more EOI data models, template EOI data records, and/or the like, and the EOI generation system 600 may not comprise and/or may not make use of the EOI model generation engine 610.

Human Cognitive Navigation Model

In various embodiments, a high cognitive load model 200 provides the extraction engine 100 with scenario information/data and/or scenario templates that may be used by the identification engine 130 to identify and/or determine high cognitive load portions of a route and by the content generating engine 120 to generate, determine, and/or extract familiarization information/data corresponding to the high cognitive load portions of the route. In various embodiments, the familiarization information/data comprises familiarization content to be provided to a user (e.g., via an IUI provided via the user interface 28 of the vehicle apparatus 20) and information/data regarding how and when/where the familiarization content is to be provided to the user. In an example embodiment, the high cognitive load model 200 is and/or comprises a cognitive navigation model 205 configured for modeling human cognitive processing in various navigation scenarios. In an example embodiment, the cognitive navigation model is trained using navigation information/data, user behavior information/data, and/or feedback directly from one or more users (e.g., a user questionnaire). In an example embodiment, the cognitive navigation model is trained using machine learning with support from a machine learning engine.

In various embodiments, a high cognitive load model 200 may be personalized for an individual user, a class of users, and/or may be generic to all users. For example, a high cognitive load model 200 that is generic to all users may be used as the data extraction model 620 of an EOI generation system 600 and high cognitive load models 200 that are personalized for a user and/or a class of users may be used as the high cognitive load model 200 of familiarization system 500, in an example embodiment. In various embodiments, personalizing the high cognitive load model for an individual user may include the using user behavior information/data (e.g., stored in the user behavior database 260), information/data from a driver questionnaire completed by the user, profile information/data from a user profile corresponding to the user, user preferences (e.g., as indicated in the user profile corresponding to the user), and/or other information/data corresponding to the individual user in the generation of the high cognitive load model 200. In various embodiments, users may be grouped into classes of users. In various embodiments, users are grouped into classes based on one or more user attributes that users have in common. For example, users may be grouped based on one or more of age, driving experience, number of years driving, memory problems, individual user preferences, similar answers being provided by the users on a driver questionnaire, driving aggressiveness, and/or the like. In various embodiments, personalizing the high cognitive load model for a class of users may include the using user behavior information/data (e.g., stored in the user behavior database 260) corresponding to one or more users in the class of users, information/data from driver questionnaires completed by one or more users in the class of users, profile information/data from user profiles corresponding to one or more users in the class of users, user preferences (e.g., as indicated in user profiles corresponding to one or more users in the class of users), and/or other information/data corresponding to one or more users in the class of users in the generation of the high cognitive load model 200.

FIG. 9 provides a block diagram of an example model generation system 900. In an example embodiment, the model generation system 900 comprises some form of direct user input, such as a driver questionnaire 915. In an example embodiment, the driver questionnaire 915 takes the form of a survey or other questionnaire that a user may complete and the answers provided by the user may be stored in a questionnaire database and/or the like. In an example embodiment, the driver questionnaire 915 may take the form of information/data extracted from a user profile corresponding to a user and/or user preferences. For example, the driver questionnaire 915 may provide the dynamic model creation engine 910 with demographic information/data regarding a individual user and/or class of users (e.g., age, number of years driving, driving experience level, and/or the like). In an example embodiment, the driver questionnaire 915 may provide the dynamic model creation engine 910 with information/data regarding scenarios that a user may find stressful to navigate (e.g., a navigation scenario that raises the user's cognitive load). For example, in one example embodiment, the driver questionnaire 915 may ask users to rate various scenarios on a scale of not stressful to very stressful, and/or the like. In various embodiments, the results and/or responses to driver questionnaires 915 submitted by one or more users may be stored in a questionnaire data store (e.g., database) on memory 14 of the network apparatus 10 and/or another memory accessible to the network apparatus 10.

In various embodiments, the model generation system 900 comprises user behavior database 260. In various embodiments, the user behavior database is stored in memory 14 of the network apparatus 10 and/or in another memory accessible to the network apparatus 10. For example, the dynamic model creation engine 910 may be personalized for an individual user and/or class of users based on user behavior information/data stored in the user behavior database 260, a user profile, and/or the like. For example, the dynamic model creation engine 910 may analyze user behavior information/data stored in the user behavior database 260 to determine how users in general, users of a class of users, and/or an individual user has responded to various navigation scenarios in the past. For example, the determination of types of navigation scenarios that are stressful (e.g., increase cognitive load for a user navigating through the navigation scenario) may be based on behavior information/data stored in the user behavior database 260.

In various embodiments, the model generation system 900 comprises a model configuration engine 450. In an example embodiment, the model configuration engine 450 is part of the configuration engine 400. In various embodiments, the model configuration engine 450 operates on the network apparatus 10 and/or as a distributed application operating in part on the network apparatus 10 and in part on the vehicle apparatus 20. In various embodiments, the model configuration engine 450 is configured to receive configuration information/data, store and/or format the received configuration information/data and provide the configuration information/data to the dynamic model creation engine 910. For example, one or more users may fill out an operator/driver questionnaire or survey regarding navigation scenarios and/or driving situations that may cause the user stress (e.g., increase the user's cognitive load), user preferences and/or feedback regarding what type of familiarization content (e.g., content, how the content is provided, and/or the like) help to reduce the user's cognitive load, and/or the like. The questionnaire or survey results may be provided to the model configuration engine 450 as configuration information/data. For example, in an example embodiment, the model configuration engine 450 may access driver questionnaire results and/or responses stored in a questionnaire data store and provide the results and/or responses to the dynamic model creation engine 910.

In an example embodiment, the model generation system 900 comprises a navigation engine 300. In an example embodiment, a navigation engine 300 is configured for providing navigation information/data. For example, a navigation engine 300 may access a geographic database and provide the dynamic model creation engine 910 with geographic information/data such as POI information/data (static and/or dynamic elements), EOI information/data (static and/or dynamic elements), roadway information/data (e.g., link and/or node data records), and/or the like. In an example embodiment, the navigation engine 300 may operate at least in part on the network apparatus 10 to provide the dynamic model creation engine 910 with geographic information/data.

In various embodiments, the dynamic model creation engine 910 is configured to generate a high cognitive load model 200. In various embodiments, the dynamic model creation engine 910 generates a cognitive navigation model 205. For example, the cognitive navigation model 205 may be generated based on the user behavior information/data, questionnaire information/data, and navigation information/data. In an example embodiment, the cognitive navigation model 205 is trained using the user behavior information/data, questionnaire information/data, and/or navigation information/data via machine learning supported by the machine learning engine 950. In an example embodiment, the machine learning engine 950 may use an unsupervised machine learning algorithm to train the cognitive navigation model 205. For example, the dynamic model creation engine 910 may be a neural network and/or deep net that is configured and/or trained to receive user behavior information/data, questionnaire information/data, and/or navigation information/data as input and provide one or more instances of scenario information/data and/or scenario templates corresponding to high load navigation scenarios (e.g., navigation scenarios that are likely and/or expected to increase a user's cognitive load as the user navigates the navigation scenario) as output.

In various embodiments, the cognitive navigation model 205 is comprises one or more instances of scenario information/data and/or scenario templates that each correspond to a high load navigation scenario. In various embodiments, a high load navigation scenario may relate to an EOI and/or POI (e.g., based on static and/or dynamic elements thereof), road geometry and/or topology, a maneuver to be navigated through (e.g., taking a right and then taking an immediate left on a road having multiple lanes of traffic in the same direction), and/or the like. In various embodiments, an instance of scenario information/data and/or a scenario template may be compared to route information/data (e.g., by the identification engine 130) to identify high cognitive load portions of a route corresponding to and/or matching a high load navigation scenario described by the instance of scenario information/data and/or scenario template. For example, an instance of scenario information/data and/or scenario template may comprise the information/data required for identifying a portion of a route (based on the route information/data) that is similar to an example high load navigation scenario by matching a navigation scenario profile corresponding to the example high load navigation scenario, and/or that satisfies one or more threshold requirements determined and/or defined based on an example high load navigation scenario and provided by the instance of scenario information/data and/or scenario template.

In various embodiments, an instance of scenario information/data and/or scenario template comprises information/data identifying, indicating, and/or the like familiarization content to be generated, determined, and/or extracted for a high cognitive load portion that matches, satisfies, and/or is identified based on the instance of scenario information/data and/or scenario template. For example, the instance of scenario information/data and/or scenario template may indicate text and/or graphics to be provided to a user (e.g., via the user interface 28) and/or a text and/or graphic template(s) to be populated and provided to the user (e.g., via the user interface 28) when the user reaches the trigger point corresponding to high cognitive load portion. In an example embodiment, the instance of scenario information/data and/or scenario template comprises information/data that defines the trigger point, a type of trigger point (e.g., distance to the high cognitive load portion and/or time before the user is expected to reach the high load), and/or other information/data that may be taken into account when determining the trigger point for high cognitive load portions matching the navigation scenario.

As noted above, a dynamic model creation engine 910 may be personalized for an individual user, a class of users, and/or users in general. Similarly, the cognitive navigation model 205 may be personalized for an individual user, class of users, and/or users in general. In an example embodiment, the cognitive navigation model 205 is personalized by being generated and/or created by a dynamic model creation engine 910 that is personalized for the same individual user, class of users, and/or users in general. In an example embodiment, a dynamic model creation engine 910 that is not personalized for users in general (e.g., that is not particular to an individual user and/or class of users) may be used to generate a cognitive navigation model 205 that is personalized for an individual user and/or class of users by considering user behavior information/data and/or questionnaire information/data corresponding to the individual user and/or class of users when generating the cognitive navigation model 205. In an example embodiment, a dynamic model creation engine 910 that is personalized to a class of users may be used to generate a cognitive navigation model 205 that is personalized to an individual user that is a member of the corresponding class of users by considering user behavior information/data and/or questionnaire information/data particular to the individual user when generating the cognitive navigation model 205.

In various embodiments, the cognitive navigation model 205 may comprise an indicator of the individual user and/or class of users the cognitive navigation model 205 is personalized for. For example, the cognitive navigation model 205 may comprise a user identifier corresponding to a user profile corresponding to the individual user to which the cognitive navigation model has been personalized. For example, the cognitive navigation model 205 may comprise a class identifier corresponding to a class of users for which the cognitive navigation model has been personalized. In an example embodiment, if the cognitive navigation model 205 is personalized for users in general, the cognitive navigation model 205 may or may not comprise an indication that the cognitive navigation model 205 corresponds to a generic user and/or users in general.

FIG. 10 provides a flowchart illustrating example processes, procedures, and/or operations for generating and providing a cognitive navigation model 205 for use in determining and providing a user with familiarization content as a user navigates a route. Starting at block 1002, a dynamic model creation engine 910 is generated, programmed, trained, and/or the like. For example, the network apparatus 10 may generate and/or trained a dynamic model creation engine 910. For example, the network apparatus 10 may comprise means, such as processor 12, memory 14, and/or the like, for generating and/or training a dynamic model creation engine 910. For example, the network apparatus 10 may use a machine learning engine 950 (e.g., operating on the network apparatus 10) to train the dynamic model creation engine 910. In various embodiments, user behavior information/data may be accessed and/or received from the user behavior database 260, questionnaire information/data corresponding to driver questionnaire 915 may be accessed and/or received from the questionnaire database, and/or navigation information/data may be accessed and/or received from navigation engine 300 and used to generate, program, and/or train the cognitive navigation model 205.

At block 1004, a cognitive navigation model 205 is generated. For example, the network apparatus 10 may operate a dynamic model creation engine 910 to generate a cognitive navigation model 205. For example, the network apparatus 10 may comprise means, such as processor 12, memory 14, and/or the like for generating a cognitive navigation model 205. In an example embodiment, the generation of the cognitive navigation model 205 comprises identifying and/or determining high load navigation scenarios (e.g., navigation scenarios that are likely and/or expected to be stressful and/or cause the user increased cognitive load as the user prepares to and/or navigates the navigation scenario) (at block 1006) and generating scenario information/data and/or scenario templates corresponding to the identified and/or determined navigation scenarios that are likely and/or expected to be stressful for a user navigating the navigation scenario (at block 1008).

For example, the dynamic model creation engine 910 may be operated, at block 1006, to analyze navigation information/data (e.g., based on user behavior information/data and/or questionnaire information/data) to identify and/or determine high load navigation scenarios.

Once one or more high load navigation scenarios have been identified and/or determined, the dynamic model creation engine 910 may generate corresponding instances of scenario information/data and/or scenario templates, at block 1008. In various embodiments, an instance of scenario information/data and/or scenario template comprises scenario identifying information/data for identifying high cognitive load portions of a route by identifying portions of a route that match and/or are similar to a high load navigation scenario and information/data for generating familiarization information/data (e.g., familiarization content and/or a trigger point) for an identified high cognitive load portion that matches and/or is similar to the high load navigation scenario.

For example, an instance of scenario information/data and/or scenario template may comprise scenario identifying information/data for identifying and/or determining portions of a route, based on route information/data (e.g., EOI information/data, POI information/data, roadway information/data (e.g., link and/or node records), and/or the like corresponding to a route), that match the high load navigation scenario. In an example embodiment, a portion of a route matches a high load navigation scenario if the portion of the route matches a profile of the high load navigation scenario (e.g., as provided by the corresponding instance of scenario information/data and/or scenario template). In an example embodiment, a portion of a route matches a high load navigation scenario if the portion of the route satisfies one or more threshold requirements corresponding to the high load navigation scenario (e.g., as provided by the corresponding instance of scenario information/data and/or scenario template). In an example embodiment, a portion of a route matches a high load navigation scenario if the portion of the route fits a template provided by the corresponding instance of scenario information/data and/or scenario template. Thus, in various embodiments, an instance of scenario information/data and/or scenario template comprises a profile of a navigation scenario, one or more threshold requirements corresponding to a high load navigation scenario, a template corresponding to a high load navigation scenario, and/or the like. In various embodiments, the profile of a high load navigation scenario, one or more threshold requirements corresponding to a high load navigation scenario, template corresponding to a high load navigation scenario, and/or the like is generated by the dynamic model creation engine 910 responsive to identifying a high load navigation scenario.

For example, an instance of scenario information/data and/or scenario template may comprise familiarization content and/or a template that may be populated and provided as familiarization content for an identified high cognitive load portion that matches and/or is similar to the corresponding high load navigation scenario. For example, an instance of scenario information/data and/or scenario template may comprise text and/or graphics to be provided to a user (e.g., via the user interface 28) and/or text and/or graphic template (s) to be populated and provided to the user (e.g., via the user interface 28) when the user reaches the trigger point corresponding to an identified high cognitive load portion that matches and/or is similar to the corresponding high load navigation scenario. In various embodiments, the instance of scenario information/data and/or scenario template may comprise information/data indicating how the familiarization content should be provided to a user in various situations. For example, in an example embodiment, the instance of scenario information/data and/or scenario template comprises information/data that defines the trigger point, a type of trigger point (e.g., distance to the high cognitive load portion and/or time before the user is expected to reach the high load), and/or other information/data that may be taken into account when determining the trigger point for high cognitive load portions matching the high load navigation scenario. For example, the instance of scenario information/ data and/or scenario template may indicate that if the user is traveling at greater than a particular speed, the familiarization content is to be provided with greater urgency and/or more assertively (e.g., louder, in a more assertive voice/tone, and/or the like).

At block 1010 the cognitive navigation model 205 is provided. For example, the cognitive navigation model 205 may be provided to an extraction engine 100 (operating on the network apparatus 10). For example, the network apparatus 10 may comprise means, such as processor 12, memory 14, and/or the like, for providing the cognitive navigation model 205. In various embodiments, an extraction engine 100 may use the cognitive navigation model 205 to generate familiarization information/data for a route. For example, the extraction engine 100 may use the cognitive navigation model 205 to identify and/or determine high cognitive load portions of a route and to generate, determine, and/or extract familiarization information/data for the high cognitive load portions.

At block 1012, user feedback is received. For example, the network apparatus 10 may receive user feedback from one or more vehicle apparatuses 20. For example, the network apparatus 10 may comprise means, such as processor 12, memory 14, and/or communications interface 16, for receiving feedback from one or more vehicle apparatuses 20. In an example embodiment, the user feedback is provided via user responses to a follow up driver questionnaire (e.g., completed via an IUI provided via the user interface 28). In an example embodiment, the user feedback is provided as biometric data corresponding to the user that was captured as the user navigated the route. In an example embodiment, the biometric data is captured by one or more sensors of the vehicle apparatus 20. In an example embodiment, the biometric data is captured by a user apparatus such as a wearable device (e.g., smart watch, Fitbit, and/or the like) that provides the captured biometric data to the vehicle apparatus 20 and/or to the network apparatus 10 (e.g., via the cloud and/or one or more networks 50). In an example embodiment, the user feedback is provided via analyzing user behavior information/data captured as the user navigated the route. For example, one or more sensors of the vehicle apparatus 20 may capture information/data as the user navigates the route that indicate and/or correspond to user behavior (e.g., speed, acceleration, intensity of braking, use of blinkers, and/or the like). The user behavior information/data may be provided to the network apparatus 10 for analysis and/or inclusion in the user behavior database 260. In various embodiments, user feedback may be associated with a individual user, a class of users, and/or with users in general. As should be understood, various forms of user feedback may be received by the network apparatus 10.

At block 1014, the dynamic model creation engine 910 is updated based on the received user feedback. For example, the network apparatus 10 may analyze the received user feedback and update the dynamic model creation engine 910 based thereon. For example, the network apparatus 10 may provide the received user feedback to the dynamic model creation engine 910 as user behavior information/data and/or questionnaire information/data and update, continue to configure and/or train (e.g., using machine learning engine 950), and/or re-configure and/or retrain (e.g., using machine learning engine 950) the dynamic model creation engine 910 based at least in part on the received user feedback. For example, the network apparatus 10 may comprise means, such as processor 12, memory 14, and/or the like, for updating, continuing to configure and/or train, and/or re-configuring and/or retraining the dynamic model creation engine 910 based at least in part on the received user feedback. The process may then return to block 1004.

Technical Advantages

Various embodiments of the present invention provide methods, apparatuses, systems, computer program products, and/or the like for providing familiarization content to a user navigating a route (e.g., driving/operating a vehicle 5 along a route). In various embodiments, the route may be unfamiliar and/or novel to the user. In various embodiments, the familiarization content is provided to the user via an IUI provided via a user interface 28 of a vehicle apparatus 20. The familiarization content is configured to aid a user in navigating a high cognitive load portion of a route with a decreased cognitive load compared to if the user was not provided the familiarization content. Therefore, the user may focus more on the task at hand (e.g., driving/operating the vehicle 5). Thus, in various embodiments, an improved IUI is provided wherein a user may provide input regarding a particular trip (e.g., provide input indicating a destination location) and be provided with not only an overview and/or turn-by-turn instructions for a route to the destination location, but appropriately timed familiarization content to decrease the user's stress level and/or cognitive load as the user navigates the route. Thus, various embodiments of the present invention provide an improvement to navigation and/or routing technologies and corresponding user interfaces.

Various embodiments of the present invention provide methods, apparatuses, systems, computer program products, and/or the like for incorporating dynamic elements of a POI into a POI model that may be used for identifying high cognitive load portions of a route. In an example embodiment, the dynamic elements may corresponding to (near) real-time and/or current information/data corresponding to a POI. For example, a dynamic element of a POI model corresponding to a cross walk signal may indicate the status of the cross walk signal (e.g., as received from a broadcast from the cross walk signal itself, a traffic control computing system, and/or the like). Thus, various embodiments are configured to provide a user with improved, (near) real-time accurate route information/data and/or familiarization content. In various embodiments, the dynamic elements of a POI may be used to identify high cognitive load portions and/or to generate the corresponding familiarization content. Thus, various embodiments of the present invention provide an improvement to navigation and/or routing technologies.

Various embodiments of the present invention provide methods, apparatuses, systems, computer program products, and/or the like generating and using EOIs by linking two or more POIs. In various embodiments, an EOI model describing an EOI may comprise static elements and dynamic elements. Various embodiments use an automated understanding of the relationships between the POIs that comprise an EOI to provide a user with improved route information/data and/or familiarization content. For example, EOIs provide a user with more context regarding two or more POIs than the individual POIs can provide individually. Thus, various embodiments are configured to provide a user with improved, (near) real-time accurate route information/data and/or familiarization content. In various embodiments, the dynamic and/or static elements of an EOI may be used to identify high cognitive load portions and/or to generate the corresponding familiarization content. Thus, various embodiments of the present invention provide an improvement to navigation and/or routing technologies.

Various embodiments of the present invention provide methods, apparatuses, systems, computer program products, and/or the like for generating and using a cognitive navigation model for modeling human cognitive processing of various navigation scenarios. The cognitive navigation model enables the identification of portions of a route that may be stressful and/or cause a user navigating the route to experience an increased cognitive load. In particular, the cognitive navigation model enables the system to provide appropriate and effective familiarization content for portions of the route where providing familiarization content is most helpful for a user. Thus, the cognitive navigation model improves the efficiency and effectiveness of providing familiarization content to a user. Thus, various embodiments of the present invention provide an improvement to navigation and/or routing technologies.

III. Example Apparatus

The network apparatus 10 and/or vehicle apparatus 20 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the network apparatus 10 and/or vehicle apparatus 20 may be embodied in other types of computing devices, such as a server, a personal computer, a computer workstation, a laptop computer, a plurality of networked computing devices or the like, that are configured to determine and/or generate one or more EOIs, determine and/or identify portions of a route associated with increased cognitive load for a user traversing the route, extracting and/or generating familiarization information/data for portions of a route associated with increased cognitive load, providing the familiarization information/data, providing a user with an interactive user interface for receiving trip and/or route information/data and/or providing a user with route information/data and/or familiarization content for the route. In an example embodiment, a vehicle apparatus 20 is an in-vehicle navigation system onboard a vehicle 5 or a mobile device and a network apparatus 10 is a server. In this regard, FIG. 2A depicts an example network apparatus 10 and FIG. 2B depicts an example vehicle apparatus 20 that may be embodied by various computing devices including those identified above. As shown, the network apparatus 10 of an example embodiment may include, may be associated with, or may otherwise be in communication with a processor 12 and a memory device 14 and optionally a communication interface 16 and/or a user interface 18. Similarly, the vehicle apparatus 20 may comprise a processor 22, memory 24, a communications interface 26, a user interface 28, one or more location sensors 29 (e.g., a GNSS sensor; IMU sensors; an odometry system, and/or the like) and/or other components configured to perform various operations, procedures, functions or the like described herein. For example, in an example embodiment, a vehicle apparatus 20 may comprise further sensors such as, for example, a camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 20 to determine one or more features of the corresponding vehicle's 5 surroundings and/or monitor the vehicle's 5 operating parameters).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10 and/or vehicle apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor 12, 22 may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10 and/or vehicle apparatus 20 may include a user interface 18, 28 that may, in turn, be in communication with the processor 12, 22 to provide output to the user, such as one or more instances of map information/data and/or graphical presentations thereof, one or more routes through a road network, and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The network apparatus 10 and/or vehicle apparatus 20 may further include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10 and/or vehicle apparatus 20 of an example embodiment, a navigation system may also include or have access to a geographic database that includes a variety of data (e.g., map information/data) utilized in constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment or link data records, point of interest (POI) data records, entity of interest (EOI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, EOI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to links, road segments, nodes, intersection, POIs, EOIs, and/or the like and/or the corresponding data records, a localization layer (e.g., comprising localization features) and/or the corresponding data records, and/or the like.

In an example embodiment, the road segment data records are links or segments, e.g., maneuvers of a maneuver graph, representing roads, streets, or paths, as can be used in the calculated route or recorded route information for determination of one or more personalized routes. The intersection data records are end points corresponding to the respective links or segments of the road segment data records. The road link data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The road/link segments, intersections, and/or nodes can be associated with attributes, such as geographic coordinates, street names, address ranges, speed limits, turn restrictions at intersections, and other navigation related attributes, as well as EOIs and/or POIs, such as gasoline stations, hotels, restaurants, museums, stadiums, offices, automobile dealerships, auto repair shops, buildings, stores, parks, etc. The geographic database can include information/data about the EOIs and/or POIs and their respective locations in the EOI and/or POI data records. The geographic database can also include data about places, such as cities, towns, or other communities, and other geographic features, such as bodies of water, mountain ranges, etc. Such place or feature data can be part of the EOI and/or POI information/data or can be associated with EOIs and/or POIs or EOI and/or POI data records (such as a data point used for displaying or representing a position of a city). In addition, the geographic database can include and/or be associated with event data (e.g., traffic incidents, constructions, scheduled events, unscheduled events, etc.) associated with the POI data records, EOI data records, or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be generated and/or updated based on map information/data generated and/or extracted from sensor information/data provided by vehicle apparatuses 20 through the use of update and/or notification messages. In various embodiments, the vehicle apparatuses 20 may be onboard vehicles owned and/or operated by and/or on behalf of members of the general public or onboard vehicles owned and/or operated as part of a private fleet.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10 and/or vehicle apparatus 20 in accordance with an example embodiment may determine the time to traverse a route that includes one or more turns at respective intersections more accurately.

IV. Apparatus, Methods, and Computer Program Products

As described above, FIGS. 6 and 8 illustrate flowcharts of a network apparatus 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, simplifications, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising: receiving, via a network apparatus comprising at least one processor, at least one memory, and at least one communications interface configured to communicate via at least one network, new route information, the new route information comprising an origin location, a destination location, and a time; determining, via the network apparatus, a route based on the new route information; analyzing, via the network apparatus, route data corresponding to the route based on a high cognitive load model to identify one or more high cognitive load portions of the route, the route data comprising at least one of (a) point of interest (POI) data corresponding to a POI along the route, (b) entity of interest (EOI) data corresponding to an EOI along the route, or (c) map data corresponding to a link or node that is part of the route: generating, via the network apparatus, familiarization information for at least one of the one or more high cognitive load portions, the familiarization information comprising (a) familiarization content and (b) a trigger point, wherein the trigger point is (i) a location along a route prior to the corresponding at least one of the one or more high cognitive load portions or (ii) an amount of time until a vehicle apparatus is expected to reach the corresponding at least one of the one or more high cognitive load portions and the familiarization content is configured to be provided to a user via a user interface of the vehicle apparatus when, based at least in part on a location sensor of the vehicle apparatus, it is determined that the vehicle apparatus has reached the trigger point; and providing, via the network apparatus, the familiarization information to the vehicle apparatus.

2. The method of claim 1, further comprising determining that the route is an unfamiliar route for the user wherein the route data is analyzed responsive to determining that the route is an unfamiliar route for the user.

3. The method of claim 2, wherein it is determined that the route is an unfamiliar route for the user if a user profile corresponding to the user indicates that at least one of the following is true:
   (a) the user has not previously navigated at least a portion of the route,
   (b) at least one scenario the user has not previously navigated is present on the route,
   (c) the user has navigated the route less than a threshold number of times, or
   (d) user preferences indicate the route is treated as an unfamiliar route.

4. The method of claim 1, wherein an EOI is formed by linking two or more POIs.

5. The method of claim 1, wherein the POI data or the EOI data comprises at least one dynamic element.

6. The method of claim 5, wherein the analyzing of the route data is based at least in part on the time and the at least one dynamic element.

7. The method of claim 1, wherein the familiarization information is generated based on the high cognitive load model.

8. The method of claim 1, wherein the high cognitive load model is a cognitive navigation model.

9. The method of claim 1, wherein the high cognitive load model is configured to identify a high cognitive load portion of the route and the high cognitive load portion is a portion of the route that is expected to cause the user an increased cognitive load when the user navigates the portion of the route.

10. The method of claim 9, wherein the familiarization content is configured to reduce the user's cognitive load as the user navigates the corresponding high cognitive load portion.

11. An apparatus comprising at least one processor, at least one non-transitory memory storing computer program code, and at least one communications interface configured to communicate via at least one network, the computer program code configured to, when executed by the at least one processor, cause the apparatus to at least: receive new route information, the new route information comprising an origin location, a destination location, and a time; determine a route based on the new route information; analyze route data corresponding to the route based on a high cognitive load model to identify one or more high cognitive load portions of the route, the route data comprising at least one of (a) point of interest (POI) data corresponding to a POI along the route, (b) entity of interest (EOI) data corresponding to an EOI along the route, or (c) map data corresponding to a link or node that is part of the route: generate familiarization information for at least one of the one or more high cognitive load portions, the familiarization information comprising (a) familiarization content and (b) a trigger point, wherein the trigger point is (i) a location along a route prior to the corresponding at least one of the one or more high cognitive load portions or (ii) an amount of time until a vehicle apparatus is expected to reach the corresponding at least one of the one or more high cognitive load portions and the familiarization content is configured to be provided to a user via a user interface of the vehicle apparatus when, based at least in part on a location sensor of the vehicle apparatus, it is determined that the vehicle apparatus has reached the trigger point; and provide the familiarization information to the vehicle apparatus.

12. The apparatus of claim 11, wherein the computer program code is further configured to, when executed by the at least one processor, cause the apparatus to at least determine that the route is an unfamiliar route for the user wherein the route data is analyzed responsive to determining that the route is an unfamiliar route for the user.

13. The apparatus of claim 12, wherein it is determined that the route is an unfamiliar route for the user if a user profile corresponding to the user indicates that at least one of the following is true:
   (a) the user has not previously navigated at least a portion of the route,
   (b) at least one scenario the user has not previously navigated is present on the route,
   (c) the user has navigated the route less than a threshold number of times, or
   (d) user preferences indicate the route is treated as an unfamiliar route.

14. The apparatus of claim 11, wherein an EOI is formed by linking two or more POIs.

15. The apparatus of claim 11, wherein the POI data or the EOI data comprises at least one dynamic element.

16. The apparatus of claim 15, wherein the analyzing of the route data is based at least in part on the time and the at least one dynamic element.

17. The apparatus of claim 11, wherein the familiarization information is generated based on the high cognitive load model.

18. The apparatus of claim 11, wherein the high cognitive load model is a cognitive navigation model.

19. The method of claim 1, wherein the high cognitive load model is configured to identify the high cognitive load portion of the route and a high cognitive load portion is a portion of the route that is expected to cause the user an increased cognitive load when the user navigates the portion of the route.

20. A computer program product comprising at least one non-transitory computer-readable storage medium having computer-executable program code instructions stored herein with the computer-executable program code instructions comprising program code instructions configured to, when executed by a processor of an apparatus, cause the apparatus to at least: receive new route information, the new route information comprising an origin location, a destination location, and a time; determine a route based on the new route information; analyze route data corresponding to the route based on a high cognitive load model to identify one or more high cognitive load portions of the route, the route data comprising at least one of (a) point of interest (POI) data corresponding to a POI along the route, (b) entity of interest (EOI) data corresponding to an EOI along the route, or (c) map data corresponding to a link or node that is part of the route: generate familiarization information for at least one of the one or more high cognitive load portions, the familiarization information comprising (a) familiarization content and (b) a trigger point, wherein the trigger point is (i) a location along a route prior to the corresponding at least one of the one or more high cognitive load portions or (ii) an amount of time until a vehicle apparatus is expected to reach the corresponding at least one of the one or more high cognitive load portions and the familiarization content is configured to be provided to a user via a user interface of the vehicle apparatus when, based at least in part on a location sensor of the vehicle apparatus, it is determined that the vehicle apparatus has reached the trigger point; and provide the familiarization information to the vehicle apparatus.

\* \* \* \* \*

UNITED STATES PATENT AND TRADEMARK OFFICE
CERTIFICATE OF CORRECTION

PATENT NO. : 10,907,986 B2
APPLICATION NO. : 16/114822
DATED : February 2, 2021
INVENTOR(S) : Balakrishna Page 1 of 1

It is certified that error appears in the above-identified patent and that said Letters Patent is hereby corrected as shown below:

In the Claims

Column 50,
Line 51, "The method of claim 1" should read --The apparatus of claim 11--;
Line 60, "herein" should read --therein--.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*